US008857968B2

(12) United States Patent
Fujii et al.

(10) Patent No.: US 8,857,968 B2
(45) Date of Patent: Oct. 14, 2014

(54) INK COMPOSITION, INK CONTAINER, AND INK JET RECORDING METHOD

(75) Inventors: Yusuke Fujii, Ashigarakami-gun (JP); Kyohei Mochizuki, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 218 days.

(21) Appl. No.: 13/482,360

(22) Filed: May 29, 2012

(65) Prior Publication Data
US 2013/0002773 A1     Jan. 3, 2013

(30) Foreign Application Priority Data

Jun. 28, 2011   (JP) ................................. 2011-143468

(51) Int. Cl.
   B41J 2/175        (2006.01)
   B41J 11/00        (2006.01)
   C09D 11/101       (2014.01)
   B41J 2/21         (2006.01)
   C09D 7/14         (2006.01)

(52) U.S. Cl.
   CPC ........... C09D 11/101 (2013.01); B41J 11/0015 (2013.01); B41J 2/17503 (2013.01); B41J 2/2107 (2013.01); C09D 7/14 (2013.01)
   USPC ................. 347/100; 347/86; 347/95

(58) Field of Classification Search
   CPC ........ B41J 2/107; B41J 2/175; B41J 2/17503; B41J 11/0015; B41J 2/2107; C09D 11/30; C09D 11/322; C09D 11/101; C09D 11/0015
   USPC ............. 347/85, 86, 95–100, 102; 106/31.13, 106/31.27, 31.6, 31.75
   See application file for complete search history.

(56) References Cited

U.S. PATENT DOCUMENTS

| 6,315,402 B1 * | 11/2001 | Kawase ........................... 347/85 |
| 2006/0050116 A1 | 3/2006 | Nakajima |

(Continued)

FOREIGN PATENT DOCUMENTS

| JP | 2004-196936 A | 7/2004 |
| JP | 2007-283753 A | 11/2007 |

(Continued)

OTHER PUBLICATIONS

Notice of Reasons for Rejection, dated Sep. 3, 2013, issued in corresponding JP Application No. 2011-143468, 6 pages in English and Japanese.
Communication, dated Oct. 18, 2012, issued in corresponding EP Application No. 12169755.1, 4 pages.

* cited by examiner

Primary Examiner — Matthew Luu
Assistant Examiner — Rut Patel
(74) Attorney, Agent, or Firm — Sughrue Mion, PLLC

(57) ABSTRACT

An object of the present invention is to provide an ink composition which has excellent storage stability and has good curing sensitivity regardless of the type of a light source for irradiation, and an ink container. Another object of the present invention is to provide an ink jet recording method which provides a cured image having excellent image gloss even with an LED light source. The ink composition comprises: a radically polymerizable compound; a radical polymerization initiator; and a colorant, and having a dissolved oxygen content of 9 mg/L or more. The ink container, having a gas-impermeable structure and encapsulates the ink composition. The ink jet recording method comprises: a degassing step of reducing a dissolved oxygen between the ink container that stores the ink composition and ink-discharging nozzles; and a discharging step of discharging the degassed ink composition from the nozzles.

17 Claims, 1 Drawing Sheet

(56) References Cited

U.S. PATENT DOCUMENTS

2007/0229612 A1* 10/2007 Oyanagi et al. .................. 347/85
2009/0099277 A1* 4/2009 Nagvekar et al. .............. 522/153
2010/0126529 A1* 5/2010 Seki et al. .................... 134/22.1
2010/0233448 A1* 9/2010 Kameyama et al. ....... 428/195.1

FOREIGN PATENT DOCUMENTS

| | | |
|---|---|---|
| JP | 2011-016362 A | 1/2011 |
| JP | 2012255072 A | 12/2012 |

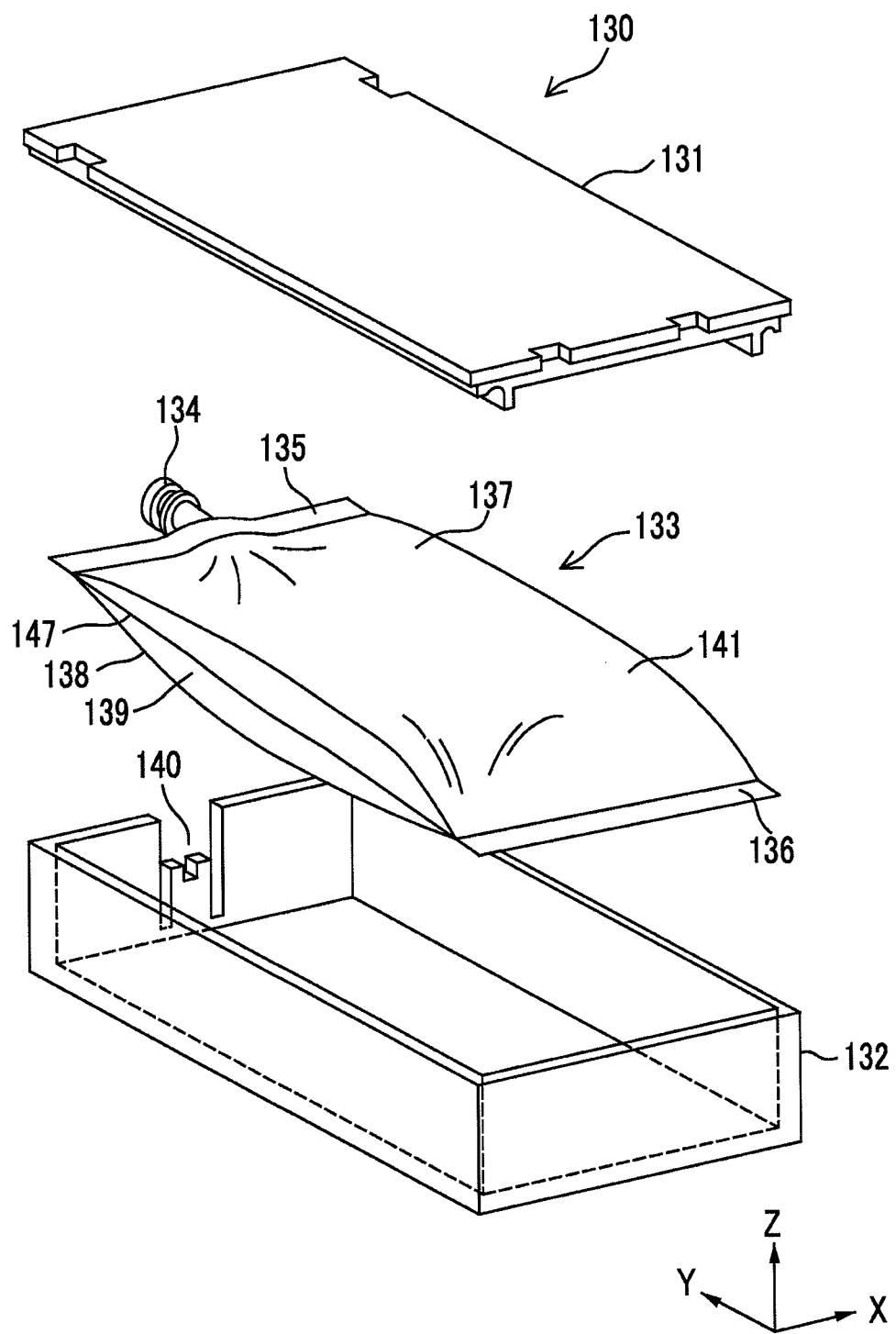

INK COMPOSITION, INK CONTAINER, AND INK JET RECORDING METHOD

BACKGROUND OF THE INVENTION

1. Field of the Invention

The present invention relates to an ink composition, an ink container, and an ink jet recording method.

2. Description of the Related Art

As an image recording method for forming an image on a recording medium such as paper based on image data signals, there are an electrophotographic system, a sublimation type and melt type thermal transfer system, an ink jet system, and the like.

With regard to the ink jet system, since the printing apparatus is inexpensive, it is not necessary to use a plate in the printing, and an image is formed directly on a recording medium by discharging an ink composition only on a desired image area, the ink composition can be used efficiently, and particularly in the case of small lot production, the running costs are low. In addition, the ink jet system causes little noise and is excellent as an image recording system, and thus, it has been attracting attention recently.

Among them, an ink jet recording ink composition which is curable by irradiation with radioactive rays such as ultraviolet rays and the like (radioactive ray-curable ink jet recording ink composition), is excellent from the viewpoint of it being possible to print on various types of recording media because, as compared with solvent-based ink compositions, the drying properties are excellent and an image is resistant to bleeding since most of the components in the ink composition are cured by irradiation with radioactive rays such as ultraviolet rays.

In addition, examples of ink compositions or ink containers in the related art include those described in JP2007-283753A, JP2011-16362A, and JP2004-196936A. JP2007-283753A and JP2011-16362A each disclose an ink-storing body including a photocurable ink composition and air being filled in a container, wherein the dissolved oxygen content in the ink composition is maintained at 3 ppm or more with an upper limit being from 5 to 6 ppm. JP2004-196936A discloses an ultraviolet ray-curable ink jet ink, which is an aqueous ink having a dissolved oxygen content in the ink at 25° C. of from 0.1 to 2 ppm.

SUMMARY OF THE INVENTION

An ink composition for business use is stored in an oxygen-impermeable container in many cases, in which the oxygen-impermeable container is stored in an ink cartridge container. For this reason, a radioactive ray-curable ink composition filled in the oxygen-impermeable container has a problem that polymerization proceeds due to a dark reaction and an ink viscosity increases. Increasing viscosity of the ink composition even a slight is not preferable since it has a significant influence on ink-discharging performance, such as landing accuracy, continuous discharging, mist, and the like.

In order to prevent the dark reaction during storage, addition of a large amount of a polymerization inhibitor, selection of a polymerizable compound, elimination of impurities, or the like may be considered, but decrease in the curing sensitivity or increase in the cost cannot be avoided.

It is an object to be accomplished by the present invention to provide an ink composition which has excellent storage stability and has good curing sensitivity regardless of the type of a light source for irradiation, and an ink container. It is another object to provide an ink jet recording method which provides a cured image having excellent image gloss even with an LED light source.

The above-described objects of the present invention have been accomplished by the following means, <1>, <11>, and <12>, which will be listed together with <2> to <10>, and <13> that are preferred embodiments:

<1> an ink composition containing a radically polymerizable compound, a radical polymerization initiator and a colorant, and the ink composition having a dissolved oxygen content of 9 mg/L or more;

<2> the ink composition according to <1>, wherein the dissolved oxygen content is from 9 to 50 mg/L;

<3> the ink composition according to <1> or <2>, wherein the radically polymerizable compound includes a monofunctional radically polymerizable compound and a polyfunctional radically polymerizable compound;

<4> the ink composition according to any one of <1> to <3>, wherein the proportion of the monofunctional radically polymerizable compound in the radically polymerizable compound is from 45 to 96% by mass;

<5> the ink composition according to <3> or <4>, wherein the monofunctional radically polymerizable compound contains an N-vinyl compound;

<6> the ink composition according to <5>, wherein the N-vinyl compound contains a compound represented by the following formula (a-1):

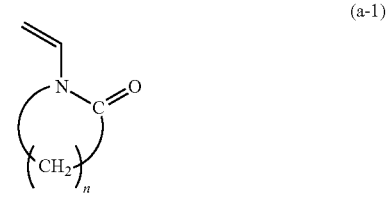

(a-1)

(in the formula (a-1), n represents an integer of 2 to 6);

<7> the ink composition according to <6>, wherein the amount of the compound represented by the formula (a-1) is 15% by mass or more, based on the total mass of the ink composition;

<8> the ink composition according to any one of <5> to <7>, wherein the monofunctional radically polymerizable compound further contains a compound represented by the formula (a-3):

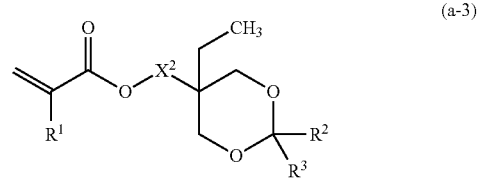

(a-3)

(in the formula (a-3), $R^1$, $R^2$, and $R^3$ each independently represent a hydrogen atom, a methyl group, or an ethyl group, and $X^2$ represents a single bond or a divalent linking group);

<9> the ink composition according to any one of <5> to <8>, wherein the monofunctional radically polymerizable compound further contains a compound represented by the formula (a-4):

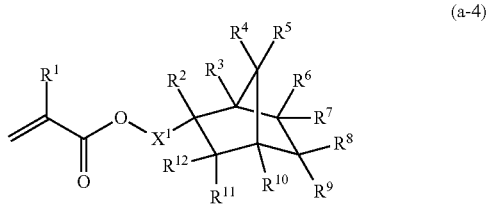

(a-4)

(in the formula (a-4), $R^1$ represents a hydrogen atom or a methyl group, $X^1$ represents a single bond or divalent linking group, and $R^2$ to $R^{12}$ each independently represent a hydrogen atom or an alkyl group);

<10> the ink composition according to any one of <1> to <9>, wherein the SP (Solubility Parameter) value of the entire radically polymerizable compound is 17.0 or more;

<11> an ink container, which has a gas-impermeable structure and encapsulate the ink composition according to any one of <1> to <10>;

<12> an ink jet recording method including a degassing step of reducing a dissolved oxygen between an ink container that stores the ink composition according to any one of <1> to <10> and ink-discharging nozzles, and a discharging step of discharging the degassed ink composition from the nozzles; and <13> the ink jet recording method according to <12>, wherein in the degassing step, the dissolved oxygen content in the ink composition is 7 mg/L or less.

The ink composition of the present invention has a high dissolved oxygen content, and thus, it can inactivate the active species generated during storage with oxygen, and therefore, it has excellent long-term storability. Further, the ink container of the present invention is a container through which air does not practically permeate, and therefore, it can maintain the dissolved oxygen content of the filled ink composition. The ink jet recording method of the present invention includes a step of reducing the dissolved oxygen before discharging the ink, and therefore, there are no cases in which radioactive ray curability is degraded in a subsequent step.

BRIEF DESCRIPTION OF THE DRAWINGS

FIG. 1 is an exploded perspective view showing an example of ink containers that may be suitably used in the present invention.

DESCRIPTION OF THE PREFERRED EMBODIMENTS

Hereinafter, the present invention will be described in detail.

Furthermore, in the present invention, the phrase "a lower limit to an upper limit" indicating a numerical range denotes "a lower limit or more and an upper limit or less", and the phrase "an upper limit to a lower limit" indicating a numerical range denotes "an upper limit or less and a lower limit or more". That is, the phrases denote numerical ranges including the upper limit and the lower limit. Further, for example, the "radically polymerizable compound (Component A)" is also simply referred to as "Component A" or the like.

In addition, in the present specification, when a group (atomic group) is described without specifying whether substituted or unsubstituted, it includes both a group having no substituent and a group having a substituent. For example, "an alkyl group" is intended to include not only an unsubstituted alkyl group but also an alkyl group having a substituent (substituted alkyl group).

The ink composition of the present invention contains a radically polymerizable compound (Component A), a radical polymerization initiator (Component B), and a colorant (Component C), and has a dissolved oxygen content of 9 mg/L or more.

Furthermore, the ink jet recording method of the present invention includes a degassing step of reducing a dissolved oxygen between an ink container which stores the ink composition and the ink-discharging nozzles, and a discharging step of discharging the degassed ink composition from the nozzles.

For convenience of the description, the dissolved oxygen in the ink composition and the degassing step in the ink jet recording method will be first described.

The ink composition of the present invention has a dissolved oxygen content of 9 mg/L or more, preferably a dissolved oxygen content of 9 to 80 mg/L, more preferably a dissolved oxygen content of 9 to 50 mg/L, and particularly preferably a dissolved oxygen content of 9 to 20 mg/L.

The dissolved oxygen content in the present invention is measured in any one of a gas chromatography method, an electrochemical method, and a fluorescence method, but in the present invention, it is measured by a polarographic type dissolved oxygen meter, and specifically, measured at 25° C. using an "Orvis Fair Oxygen Meter Model 3600" and an "Orvis Fair 31130 $O_2$ Sensor" (both manufactured by Hach Ultra Co., Ltd.).

There are several unexamined patent application publications regarding an ink receptor storing a photocurable ink composition, in which under the conditions of an ambient temperature and an ambient pressure, the dissolved oxygen content is usually limited to approximately 5 to 6 ppm (see Paragraph No. 0070 of JP2007-283753A).

In the present invention, at an ambient temperature and 1 atm, or if necessary, at 0° C. and 2 atm, pure oxygen is brought into contact with an ink composition, and preferably bubbling is carried out with an ink composition, thereby adjusting the dissolved oxygen to 9 mg/L or more.

In the ink composition of the present invention, dark polymerization during storage is prevented due to a high dissolved oxygen content, and therefore, good storage stability is exhibited.

By the ink jet recording method of the present invention, a degassing step of reducing the dissolved oxygen content of the ink composition is carried out, prior to the discharging step in which the ink composition is discharged from the nozzles. This degassing step is carried out between the ink container that stores the ink composition and the ink-discharging nozzles.

The degassing operation in the degassing step may be carried out by any one of various types of means. One means is to provide a degassing means including gas-permeable hollow fiber bundles between the ink container and the ink-discharging nozzles. By way of an example of the hollow fiber bundles, about 1,000 hollow fibers each having a diameter of about 200 μm are united, and the pressure of the outside of the hollow fibers is reduced to 0.1 atm or less, thereby reducing the dissolved oxygen of the ink composition flowing in the hollow fiber.

In an alternative means, a method in which a sub-tank is provided in an ink liquid transfer path reaching an ink head from an ink container, and the dissolved oxygen of the ink composition in the sub-tank under reduced pressure is reduced may be mentioned. In this case, the degree of pressure reduction can be appropriately selected, but is preferably from 0.1 to 0.5 atm. Further, the dissolved oxygen content of the ink composition that has passed through the degassing means is preferably measured on-line in the sub-tank. A suitable amount of the degassed ink composition is preferably stored in the sub-tank and transferred to the discharging nozzles. An example of the devices that can be used in the degassing operation from the ink composition is described in JP2000-141687A.

In the degassing step, the dissolved oxygen content is preferably set to 7 mg/L or less, more preferably in the range of 1 to 7 mg/L, and particularly preferably in the range of 1 to 3 mg/L.

Hereinafter, essential components included in the ink composition will be described.

Radically Polymerizable Compound (Component A)

In the present invention, the ink composition contains a radically polymerizable compound (Component A).

The radically polymerizable compound is a compound having an ethylenically unsaturated group that is radically polymerizable and may be any one of compounds having at least one ethylenically unsaturated group that is radically polymerizable in the molecule, and examples thereof include those having chemical forms such as monomers, oligomers, and polymers. Among these, those having chemical forms of monomers having a molecular weight of less than 400, and oligomers having a molecular weight of 400 to 10,000 are preferred.

The radically polymerizable compounds are approximately divided into monofunctional radically polymerizable compounds each having only one ethylenically unsaturated group in the molecule and polyfunctional radically polymerizable compounds each having two or more ethylenically unsaturated groups in the molecule.

The ink composition of the present invention preferably contains a monofunctional radically polymerizable compound and a polyfunctional radically polymerizable compound as a radically polymerizable compound.

Each of the monofunctional radically polymerizable compound and the polyfunctional radically polymerizable compound may be used alone or in combination of two or more kinds thereof at an arbitrary proportion so as to improve desired characteristics For the ink composition of the present invention, the proportion of the monofunctional radically polymerizable compound based on the total mass of the radically polymerizable compound is preferably from 45 to 96% by mass For the ink composition of the present invention, the radically polymerizable compound is preferably at least one radically polymerizable compound selected from a group consisting of a (meth)acrylate compound, a vinylether compound, and an N-vinyl compound, and more preferably an N-vinyl compound or a (meth)acrylate compound. Further, when indicating both or either one of the "acrylate" and the "methacrylate", or when indicating both or any one of the "(meth)acrylate", the "acryl", and the "methacryl", it may be referred to as the "(meth)acryl", respectively, in some cases For Component A, the N-vinyl compound is preferably included as the monofunctional radically polymerizable compound from the viewpoints of curability and adhesiveness. Examples of the N-vinyl compound preferably include N-vinylformamides and N-vinyllactams, and N-vinyllactam is preferably a compound represented by the following formula (a-1).

N-Vinyllactams Represented by the Formula (a-1) (Component A-1)

The ink composition that can be used in the present invention preferably includes at least an N-vinyllactam (Component A-1) as Component A from the viewpoints of curability and adhesiveness.

The compound represented by the formula (a-1) is preferably included as the N-vinyllactam (Component A-1).

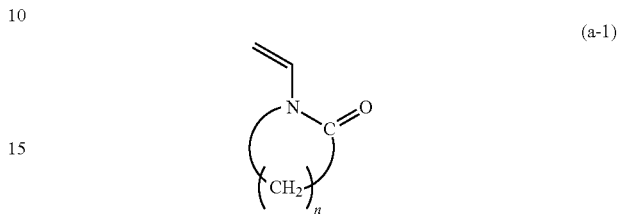

(a-1)

In the formula (a-1), n represents an integer of 2 to 6.

From the viewpoints of flexibility after curing the ink composition, adhesiveness to a recording medium, and availability of raw materials, n is preferably an integer of 3 to 6, n is more preferably 3 or 5, and n is particularly preferably 5, that is N-vinylcaprolactam is particularly preferable. The N-vinylcaprolactam is preferred since it has excellent safety, is useful in a wide range of applications, is available at relatively low cost, and can provide particularly good ink curability and adhesiveness of a cured film to a recording medium.

Further, as the N-vinyllactam, a compound having a substituent such as an alkyl group and an aryl group on a lactam ring, in addition to the compound represented by the formula (a-1) may be used, or a compound linked with a saturated or unsaturated ring structure may be used.

The compound represented by the formula (a-1) may be used alone or in combination of two or more kinds thereof.

The content of the compound represented by the formula (a-1) in the ink composition is preferably 15% by mass or more, more preferably from 15 to 60% by mass, and still more preferably from 17 to 25% by mass, based on the total mass of the ink composition. When the content is 15% by mass or more, the adhesiveness to a recording, medium is excellent, and when the content is 60% by mass or less, the storage stability is excellent.

Monofunctional (Meth)Acrylate Compound Having an Aromatic Hydrocarbon Group (Component A-2)

The ink composition of the present invention preferably contains a monofunctional (meth)acrylate compound having an aromatic hydrocarbon group (Component A-2).

As Component A-2, those having a molecular weight of 500 or less are preferred, and those having a molecular weight of 300 or less are more preferred.

Examples of Component A-2 include aromatic monofunctional radically polymerizable monomers described in Paragraph Nos. 0048 to 0063 of JP2009-096985A. In the present invention, as the monofunctional (meth)acrylate compound having an aromatic hydrocarbon group, a compound represented by the formula (a-2) is preferred.

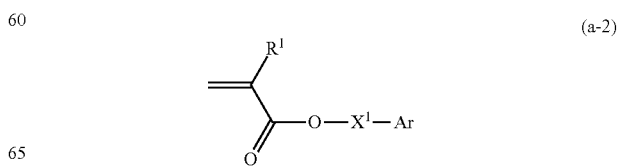

(a-2)

(in the formula (a-2), $R^1$ represents a hydrogen atom or a methyl group, $X^1$ represents a divalent linking group, and Ar represents a monovalent aromatic hydrocarbon group).

In the formula (a-2), $R^1$ is preferably a hydrogen atom.

$X^1$ represents a divalent linking group, and preferably an ether bond (—O—), an ester bond (—C(O)O— or —OC(O)—), an amide bond (—C(O)NR'— or —NR'C(O)—), a carbonyl group (—C(O)—), an imino group (—NR'—), an alkylene group having 1 to 15 carbon atoms, which may have a substituent, or a divalent group in which two or more of these groups are combined. Further, R' represents a hydrogen atom, a linear, branched, or cyclic alkyl group having 1 to 20 carbon atoms, or an aryl group having 6 to 20 carbon atoms. Examples of the substituent include a hydroxyl group and a halogen atom.

A moiety including $R^1$ and $X^1$ ($H_2C$=$C(R^1)$—C(O)O—$X^1$—) may be bonded to any position on the aromatic hydrocarbon structure. Further, from the viewpoint of increasing the affinity with a colorant, the end of $X^1$ that is bonded to the aromatic hydrocarbon group is preferably an oxygen atom, and more preferably an ethereal oxygen atom. In the formula (a-2), $X^1$ is preferably *-$(LO)_q$—. Here, * represents the position at which $X^1$ and the carboxylic ester bond in the formula (a-2) are bonded, q is an integer of 0 to 10, and L represents an alkylene group having 2 to 4 carbon atoms. q is preferably an integer of 0 to 4, more preferably an integer of 0 to 2, and still more preferably 1 or 2. $(LO)_q$ is preferably an ethylene oxide chain or a propylene oxide chain.

Ar represents a monovalent aromatic hydrocarbon group.

Examples of the monovalent aromatic hydrocarbon group include a monovalent monocyclic or polycyclic aromatic hydrocarbon group having 1 to 4 rings, and specifically, a group formed by removal of at least one hydrogen atom from benzene, naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, pleiadene, or the like.

Among these, in the present invention, a phenyl group and a naphthyl group are preferred, and a monocyclic aromatic hydrocarbon group, that is, a phenyl group is more preferred.

The monovalent aromatic hydrocarbon group may have a substituent on the aromatic ring.

The substituent is preferably a halogen atom, an alkyl group, an alkenyl group, a carboxyl group, an acyl group having 1 to 10 carbon atoms, a hydroxyl group, a substituted or unsubstituted amino group, a thiol group, a siloxane group, or a hydrocarbon group or heterocyclic group having a total number of 30 or less carbon atoms, each of which may further have a substituent.

Examples of the substituent include a hydroxyl group, an alkyl group having 1 to 10 carbon atoms, and an aryl group having 6 to 12 carbon atoms, each of which may further have a substituent.

When the monovalent aromatic hydrocarbon group has plural substituents, the substituents may be the same as or different from each other. Further, the substituents may be bonded to each other to form a 5- or 6-membered ring.

Furthermore, it is preferable that the monovalent aromatic hydrocarbon group do not have a substituent on an aromatic ring.

Specific preferred examples of Component A-2 include [L-1] to [L-65]. Further, in some of the compounds in the present specification, a hydrocarbon chain is described as a simplified structural formula in which symbols for carbon (C) and hydrogen (H) are omitted. Furthermore, Me represents a methyl group.

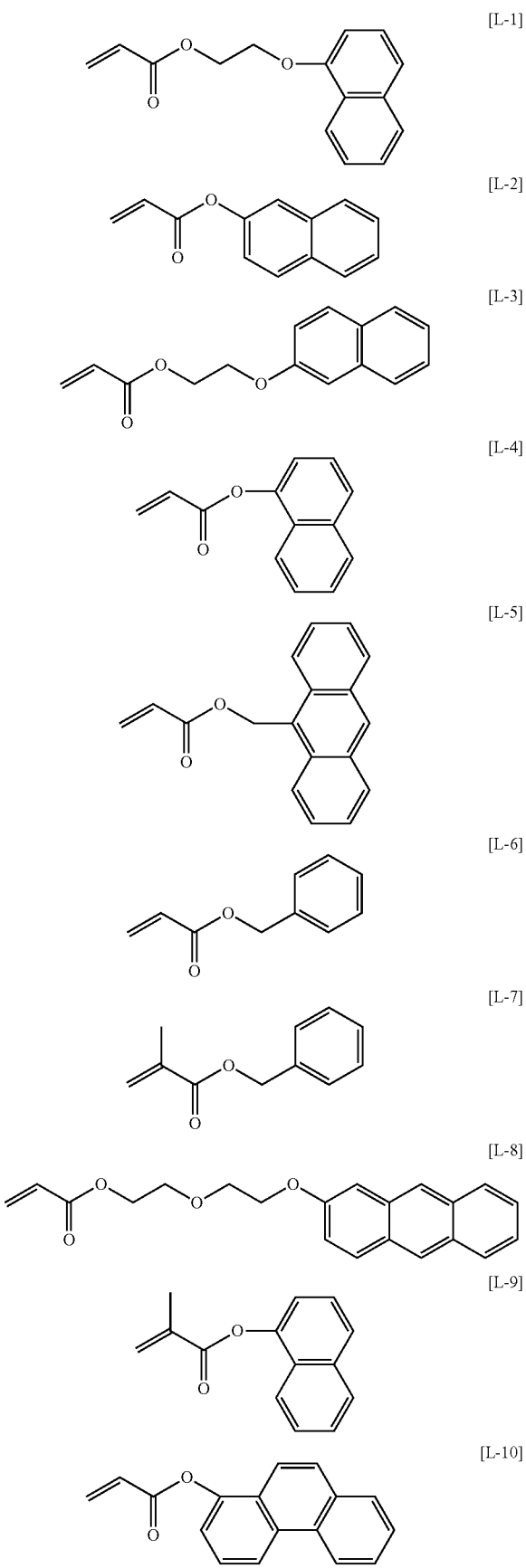

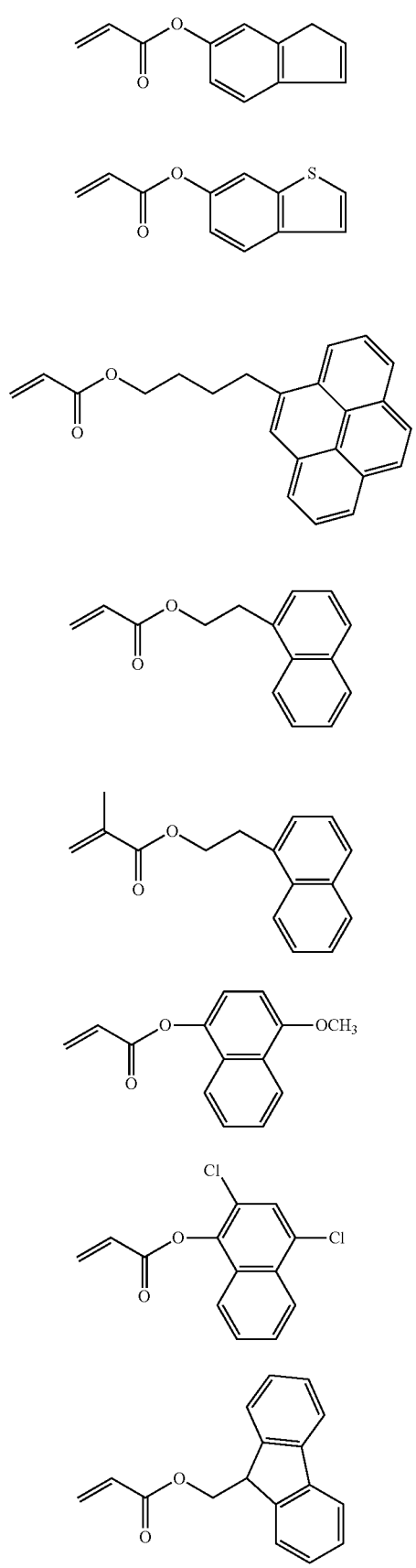

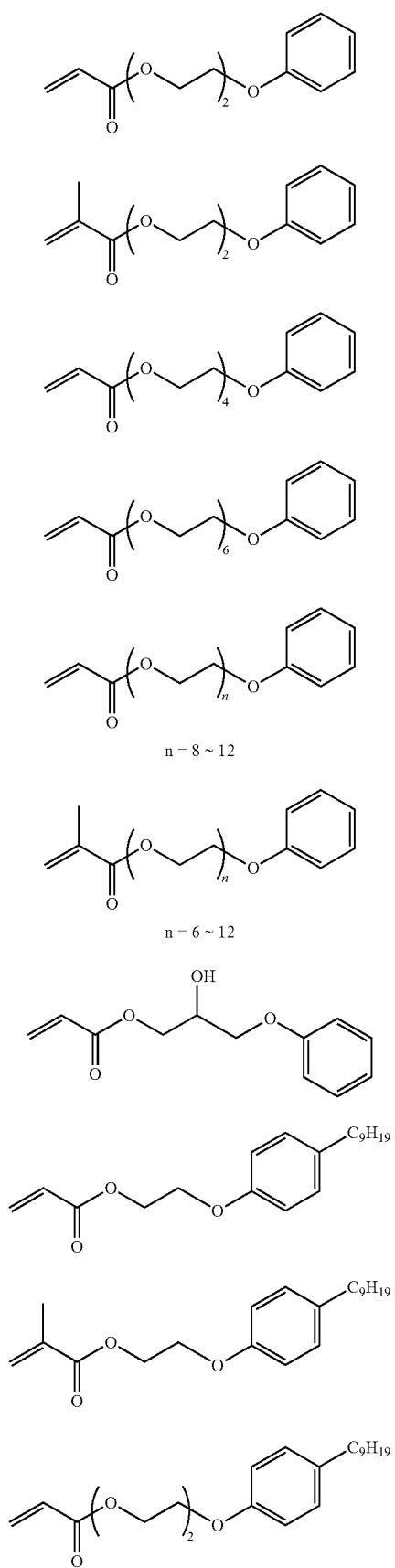
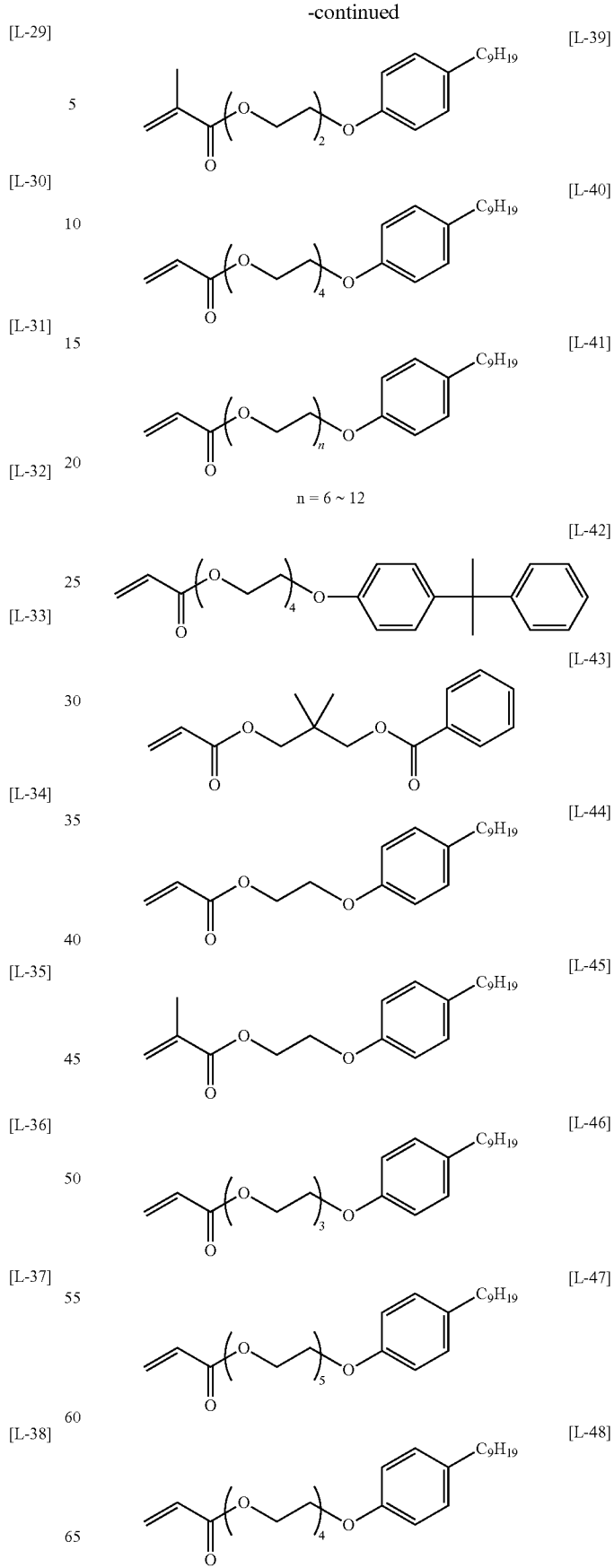

[L-49]
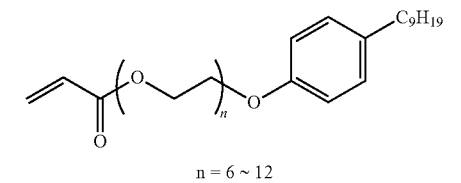
n = 6 ~ 12

[L-50]
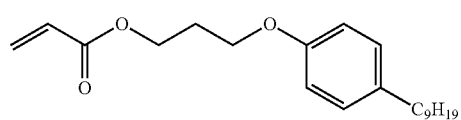

[L-51]
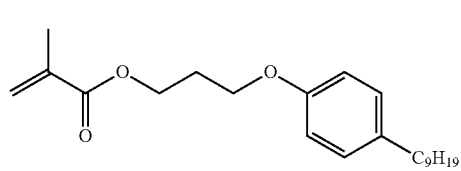

[L-52]
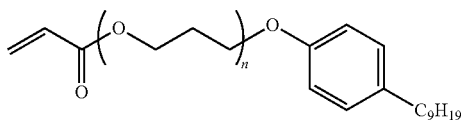
n = 2 ~ 12

[L-53]
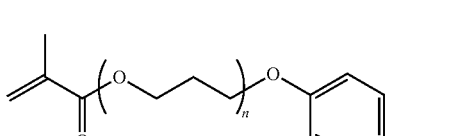
n = 2 ~ 12

[L-54]
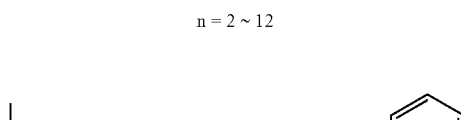

[L-55]
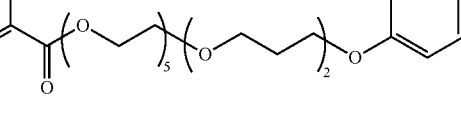

[L-56]
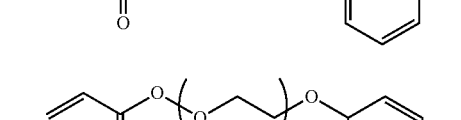

[L-57]

[L-58]

[L-59]
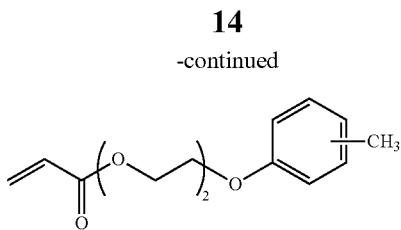

[L-60]
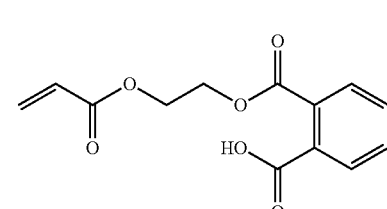

[L-61]
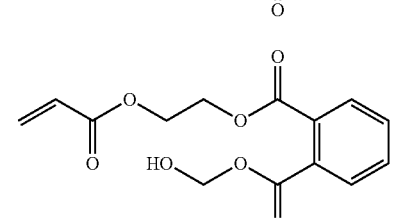

[L-62]
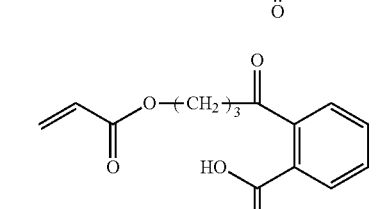

[L-63]
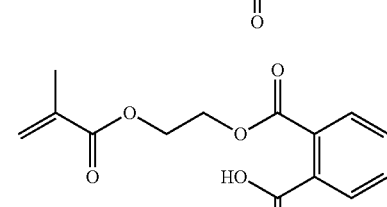

[L-64]
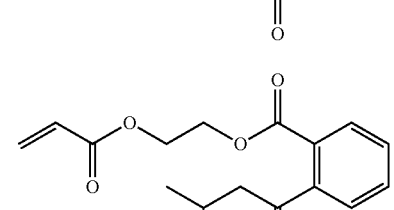

[L-65]
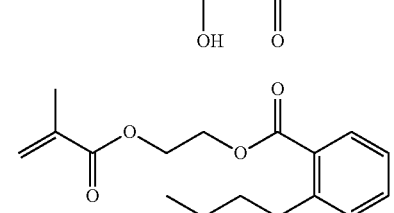

In the present invention, the compound represented by the formula (a-2) is preferably a compound having a phenyl group, more preferably 2-phenoxyethyl (meth)acrylate or benzyl (meth)acrylate, still more preferably 2-phenoxyethyl (meth)acrylate, and particularly preferably 2-phenoxyethyl acrylate.

From the viewpoint of ink jet dischargeability and flexibility, the content of Component A-2 is preferably from 5 to 60% by mass, more preferably from 20 to 50% by mass, and still more preferably from 25 to 50% by mass, based on the total mass of the ink composition.

Compound Represented by Formula (a-3) (Component A-3)

In the present invention, the ink composition preferably contains a compound represented by the formula (a-3) (Component A-3)

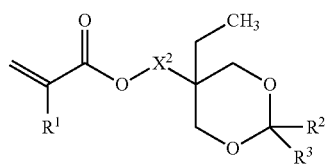

(a-3)

(in the formula (a-3), $R^1$, $R^2$, and $R^3$ each independently represent a hydrogen atom, a methyl group, or an ethyl group, and $X^2$ represents a single bond or a divalent linking group).

$R^1$ is preferably a hydrogen atom or a methyl group, and more preferably a hydrogen atom.

$R^2$ and $R^3$ each independently preferably represent a hydrogen atom or a methyl group, and $R^2$ and $R^3$ are more preferably both hydrogen atoms.

The divalent linking group in $X^2$ is not particularly limited as long as it does not significantly interfere with the effect of the present invention, but it is preferably a divalent hydrocarbon group, or a divalent group having a combination of a hydrocarbon group and an ether bond, and more preferably a divalent hydrocarbon group, a poly(alkyleneoxy) group or a poly(alkyleneoxy)alkyl group. Further, the divalent linking group preferably has 1 to 60 carbon atoms, and more preferably 1 to 20 carbon atoms.

$X^2$ is preferably a single bond, a divalent hydrocarbon group, or a divalent group having a combination of a hydrocarbon group and an ether bond, more preferably a divalent hydrocarbon group having 1 to 20 carbon atoms, still more preferably a divalent hydrocarbon group having 1 to 8 carbon atoms, and particularly preferably a methylene group.

Specific examples of Component A-3 are shown below, but are not limited thereto. Further, in the specific examples below, R represents a hydrogen atom or a methyl group.

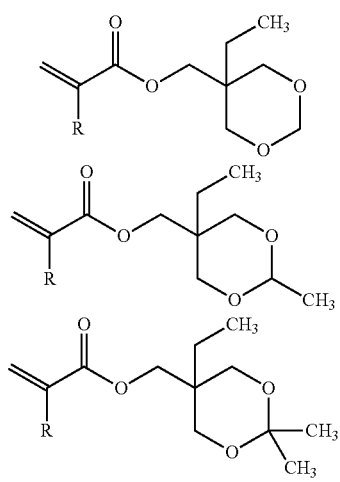

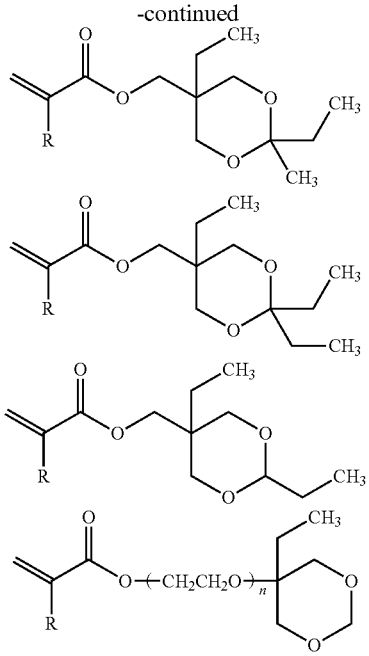

n = 1 ~ 30

Among these, a cyclic trimethylolpropane formal (meth)acrylate is preferred and a cyclic trimethylolpropane formal acrylate is particularly preferred Component A-3 may be a commercially available product and specific examples of the commercially available product include SR531 (manufactured by Sartomer Company, Inc.).

From the viewpoints of adhesiveness of a recording medium with an image and the curability of the ink composition, the content of Component A-3 is preferably from 5 to 60% by mass, more preferably from 10 to 50% by mass, still more preferably from 12 to 40% by mass, and particularly preferably from 15 to 33% by mass, based on the total mass of the ink composition.

Compound Represented by the Formula (a-4) (Component A-4)

In the present invention, the ink composition preferably contains a compound represented by the formula (a-4) (Component A-4).

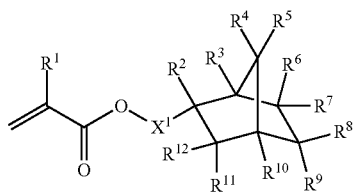

(a-4)

(in the formula (a-4), $R^1$ represents a hydrogen atom or a methyl group, $X^1$ represents a single bond or divalent linking group, and $R^2$ to $R^{12}$ each independently represent a hydrogen atom or an alkyl group).

The compound represented by the formula (a-4) may be an acrylate compound or a methacrylate compound, but it is preferably an acrylate compound, that is, $R^1$ is preferably a hydrogen atom.

The divalent linking group in $X^1$ of the formula (a-4) is not particularly limited as long as it does not significantly interfere with the effect of the present invention, but it is preferably a divalent hydrocarbon group, or a divalent group having a combination of a hydrocarbon group and an ether bond, and more preferably a divalent hydrocarbon group, a poly(alkyleneoxy) group, or a poly(alkyleneoxy)alkyl group. Further, the divalent linking group preferably has 1 to 60 carbon atoms, and more preferably 1 to 40 carbon atoms.

$X^1$ in the formula (a-4) is preferably a single bond, a divalent hydrocarbon group, or a divalent group having a combination of a hydrocarbon group and an ether bond, more preferably a single bond or a divalent hydrocarbon group, and particularly preferably a single bond.

As the alkyl group in $R^2$ to $R^{12}$ of the formula (a-4), an alkyl group having 1 to 8 carbon atoms is preferred, an alkyl group having 1 to 4 carbon atoms is more preferred, and a methyl group is particularly preferred. Further, the alkyl group in $R^2$ to $R^{12}$ may be linear or branched, and may have a ring structure.

$R^2$ to $R^{12}$ in the formula (a-4) are each independently preferably a hydrogen atom, or an alkyl group having 1 to 8 carbon atoms, more preferably a hydrogen atom or an alkyl group having 1 to 4 carbon atoms, and still more preferably a hydrogen atom or a methyl group.

Furthermore, $R^2$ to $R^{12}$ in the formula (1) are both hydrogen atoms, or it is particularly preferable that $R^3$ to $R^5$ be methyl groups and $R^2$ and $R^6$ to $R^{12}$ be hydrogen atoms, and it is most preferable that $R^3$ to $R^5$ be methyl groups and $R^2$ and $R^6$ to $R^{12}$ be hydrogen atoms.

Specific preferred examples of the compound represented by the formula (a-4) include Compounds (a-4-1) to (a-4-6) shown below, but are by no means limited thereto.

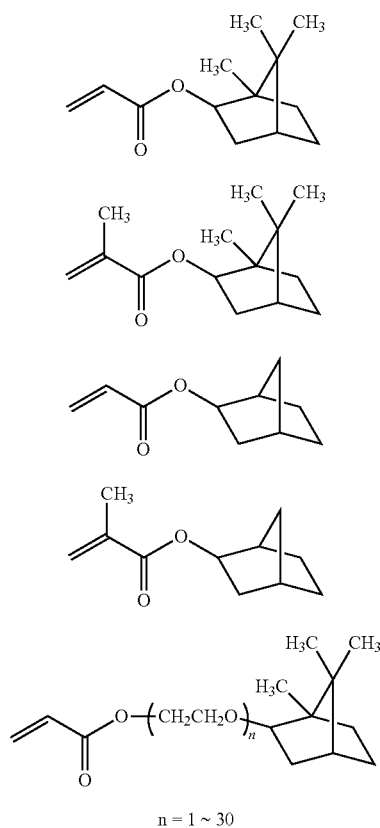

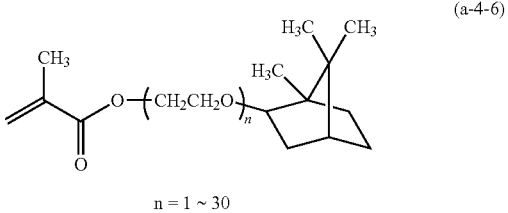

n = 1 ~ 30

Among these, isobornyl acrylate (a-4-1), isobornyl methacrylate (a-4-2), norbornyl acrylate (a-4-3), and norbornyl methacrylate (a-4-4) are preferred, isobornyl acrylate (a-4-1) and isobornyl methacrylate (a-4-2) are more preferred, and isobornyl acrylate (a-4-1) is particularly preferred.

The content of the compound represented by the formula (a-4) in the ink composition is preferably from 0 to 30% by mass, more preferably from 10 to 30% by mass, and still more preferably from 15 to 30% by mass, based on the total mass of the ink composition.

<Other Monofunctional (Meth)Acrylate Compound>

The ink composition may contain other monofunctional (meth)acrylate compounds or polyfunctional (meth)acrylate compounds other than Component A-1 to Component A-4.

Specific examples of the monofunctional (meth)acrylate other than Component A-1 to Component A-4 include isoamyl (meth)acrylate, stearyl (meth)acrylate, lauryl (meth)acrylate, octyl (meth)acrylate, isooctyl (meth)acrylate, decyl (meth)acrylate, isomyristyl (meth)acrylate, isostearyl (meth)acrylate, lactone-modified flexible (meth)acrylate, t-butylcyclohexyl (meth)acrylate, cyclopentenyl acrylate, cyclopentenyloxyethyl acrylate, and dicyclopentanyl (meth)acrylate.

The content of the monofunctional radically polymerizable compound (Components A-1 to A-4) of the ink composition is preferably from 45 to 80% by mass or more, and more preferably from 47 to 72% by mass, based on the total mass of the ink composition.

<Polyfunctional Radically Polymerizable Compound>

The ink composition of the present invention preferably contains a polyfunctional radically polymerizable compound as a radically polymerizable compound from the viewpoint of curability. Examples of the polyfunctional radically polymerizable compound include polyfunctional vinylethers and polyfunctional (meth)acrylates.

<Polyfunctional (Meth)Acrylate Compound>

The ink composition of the present invention preferably includes a polyfunctional (meth)acrylate compound as a polyfunctional radically polymerizable compound.

Specific examples of the polyfunctional (meth)acrylate compound include bis(4-acryloxypolyethoxyphenyl)propane, neopentyl glycol di(meth)acrylate, ethoxylated (2) neopentyl glycol di(meth)acrylate (compound formed by diacrylating neopentyl glycol ethylene oxide 2-mole adduct), propoxylated (2) neopentyl glycol di(meth)acrylate (compound formed by diacrylating neopentyl glycol propylene oxide 2-mole adduct), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, tetramethylolmethane tri (meth)acrylate, dimethyloltricyclodecane di(meth)acrylate, modified glycerin tri(meth)acrylate, modified bisphenol A di(meth)acrylate, a propylene oxide (PO) adduct di(meth)acrylate of bisphenol A, an ethylene oxide (EO) adduct di(meth)acrylate of bisphenol A, dipentaerythritol hexa(meth)acrylate, and caprolactone-modified dipentaerythritol hexa(meth)acrylate.

Further, as the polyfunctional (meth)acrylate compound, a combination of bifunctional or trifunctional (meth)acrylate compounds is preferably used, and dipropylene glycol di(meth)acrylate and trimethylolpropane tri(meth)acrylate are particularly preferred.

The ink composition of the present invention preferably further contains an oligomer as a polyfunctional (meth)acrylate compound.

The "oligomer" refers to a polymer having a limited number (generally 5 to 100) of monomer-based constituent units. The weight-average molecular weight of the oligomer is preferably 400 to 10,000, and more preferably 500 to 5,000.

The oligomer preferably has a (meth)acryloyl group as a functional group.

From the viewpoint of a balance between flexibility and curability, it is preferable that the number of the functional groups contained in the oligomer be from 1 to 15 per oligomer molecule, more preferably from 2 to 6, still more preferably from 2 to 4, and particularly preferably 2.

Furthermore, the yellow ink composition, the magenta ink composition, the cyan ink composition, and the black ink composition used in the present invention each preferably include an ethylenically unsaturated compound of the oligomer as Component A.

Examples of the oligomer in the present invention include polyester (meth)acrylate oligomers, olefin-based oligomers (an ethylene oligomer, a propylene oligomer, a butene oligomer, and the like), vinyl-based oligomers (a styrene oligomer, a vinyl alcohol oligomer, a vinylpyrrolidone oligomer, a (meth)acrylate oligomer, and the like), diene-based oligomers (a butadiene oligomer, a chloroprene rubber, a pentadiene oligomer, and the like), ring-opening polymerization type oligomers (di-, tri-, tetra-ethylene glycol, polyethylene glycol, polyethylimine, and the like), polyaddition type oligomers (an oligoester (meth)acrylate, a polyimide oligomer, and a polyisocyanate oligomer), addition-condensation oligomers (a phenolic resin, an amino resin, a xylene resin, a ketone resin, and the like), and amine-modified polyester oligomers. Among these, an oligoester (meth)acrylate is preferred, a urethane acrylate oligomer and a polyester (meth)acrylate oligomer are more preferred, and a urethane (meth)acrylate oligomer is particularly preferred from the viewpoint that the ink composition having excellent curability and adhesiveness can be obtained.

The oligomers may be used alone or in combination of two or more kinds thereof.

Examples of the urethane (meth)acrylate oligomer include an aliphatic urethane (meth)acrylate oligomers and aromatic urethane (meth)acrylate oligomers. With respect to the details thereof, "Oligomer Handbook" (edited by Junji Furukawa, The Chemical Daily Co., Ltd.) may also be referred to.

Examples of the urethane (meth)acrylate oligomer include U-2PPA, U-4HA, U-6HA, U-6LPA, U-15HA, U-324A, UA-122P, UA5201, UA-512 and the like, all manufactured by Shin-Nakamura Chemical Co., Ltd.; CN964A85, CN964, CN959, CN962, CN963J85, CN965, CN982B88, CN981, CN983, CN996, CN9002, CN9007, CN9009, CN9010, CN9011, CN9178, CN9788, CN9893 and the like, all manufactured by Sartomer; and EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, EB8800-20R and the like, all manufactured by Daicel-Cytec Co., Ltd.

Examples of the amine-modified polyester oligomer include EB524, EB80, and EB81, all manufactured by Daicel-Cytec Co., Ltd.; CN550, CN501, and CN551 manufactured by Sartomer; and GENOMER5275 manufactured by Rahn A.G.

From the viewpoint of compatibility of curability and adhesiveness, the content of the oligomer is preferably from 0.1 to 10% by mass, more preferably from 0.5 to 8% by mass, and still more preferably from 1 to 6% by mass, based on the total mass of the ink composition.

The content of the polyfunctional (meth)acrylate compound containing the oligomer is preferably from 0.5 to 30% by mass, more preferably from 1 to 20% by mass, and still more preferably from 1 to 10% by mass, based on the total mass of the ink composition, from the viewpoints of curability.

<Vinylether Compound>

As the Component A, vinylether compounds are preferably used, and can be largely divided into monovinylether compounds and di- or trivinylether compounds.

Examples of the vinylether compounds that are suitably used include di- or trivinylether compounds such as ethylene glycol divinylether, diethylene glycol divinylether, triethylene glycol divinylether, propylene glycol divinylether, dipropylene glycol divinylether, butanediol divinylether, hexanediol divinylether, cyclohexanedimethanol divinylether, and trimethylolpropane trivinylether; and monovinylether compounds such as ethylene glycol monovinylether, triethylene glycol monovinylether, hydroxyethyl monovinylether, ethyl vinylether, n-butyl vinylether, isobutyl vinylether, octadecyl vinylether, cyclohexyl vinylether, hydroxybutyl vinylether, 2-ethylhexyl vinylether, hydroxynonyl monovinylether, cyclohexanedimethanol monovinylether, n-propyl vinylether, isopropyl vinylether, isopropenyl vinylether, dodecyl vinylether, and diethylene glycol monovinylether.

The content of the total amount of Component A in the ink composition is preferably from 70 to 99% by mass, and more preferably from 80 to 90% by mass.

(Solubility Parameter (SP Value) of Entire Radically Polymerizable Compound)

The solubility parameter (SP value) of the entire radically polymerizable compound in the ink composition of the present invention is preferably 17.0 or more, more preferably from 17.0 to 23.0, and particularly preferably from 17.4 to 22.2.

The solubility parameter (SP value) in the present invention is a value represented by the square root of the cohesive energy of molecules. The SP values are described in the Polymer Handbook (Second Edition), Chapter IV, Solubility Parameter Values, and the values described therein are regarded as SP values in the present invention. Further, the unit is $(MPa)^{1/2}$, which denotes a value at 25° C.

Furthermore, when the SP value is not described in the data, the value calculated by the method described in R. F. Fedors, Polymer Engineering Science, 14, p. 147 to 154 (1974) is used as the SP value in the present invention.

In addition, the SP value of the entire radically polymerizable compound refers to a value averaged according to the mass proportions.

Radical Polymerization Initiator (Component B)

In the present invention, the ink composition contains a radical polymerization initiator (Component B).

The radical polymerization initiator that can be used in the present invention is a compound that generates a radical polymerization initiating species by absorption of external energy. The external energies that are used to initiate the polymerization are largely classified into heat and light energy, which are utilized by thermopolymerization initiators and photopolymerization initiators, respectively. Examples of the active radioactive ray may include γ rays, β rays, an electron beam, ultraviolet rays, visible light, and infrared light.

Moreover, examples of the radical polymerization initiator in the present invention include a compound that generates a radical polymerization initiating species by absorption of external energy such as active radioactive rays as well as a compound that promotes decomposition of the radical polymerization initiator by absorption of specific active radioactive rays, a so-called sensitizer.

As the radical polymerization initiator (Component B) that can be used in the present invention, a known radical polymerization initiator can be used.

Examples of the radical polymerization initiator that can be used in the present invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, and (l) compounds having a carbon-halogen bond. As the radical polymerization initiator, the compounds in (a) to (l) above are used alone or in combination of two or more kinds thereof.

The radical polymerization initiator in the ink composition is used alone or in combination of two or more kinds thereof.

In the present invention, as the radical polymerization initiator (Component B), α-hydroxyketone compounds, α-aminoalkylphenone compounds, thioxanthone compounds, and acylphosphine compounds each shown below are preferably used.

<α-Hydroxyketone Compound>

Specific examples of the α-hydroxy ketone compound include 1-[4-(2-hydroxyethoxy)phenyl]-2-hydroxy-2-methyl-1-propane-1-one, 2-hydroxy-2-methyl-1-phenyl-propane-1-one, and 1-hydroxycyclohexyl phenyl ketone, and among them, a 1-hydroxycyclohexyl phenyl ketone compound is preferred. Further, in the present invention, examples of the 1-hydroxycyclohexyl phenyl ketone compound include a compound in which 1-hydroxycyclohexyl phenyl ketone is substituted with any substituent. The substituent may be selected freely as long as capability as a radical polymerization initiator is exhibited, and specific examples include an alkyl group having 1 to 4 carbon atoms.

<α-Aminoalkylphenone Compound>

In the present invention, Component B included in the ink composition preferably includes an α-aminoalkylphenone compound. Such an α-aminoalkylphenone compound is represented by the following formula (1) or (2).

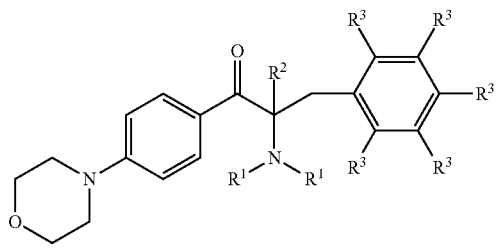

(1)

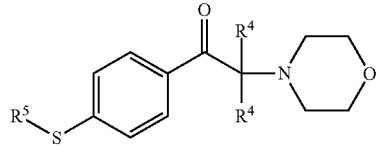

(2)

(wherein $R^1$'s each independently represent an alkyl group having 1 to 8 carbon atoms, and two $R^1$'s may be combined to form a ring other than an aromatic ring, $R^2$ represents an alkyl group having 1 to 8 carbon atoms, $R^3$'s each independently represent a hydrogen atom, a halogen atom, or an alkyl group having 1 to 8 carbon atoms or an alkyl group having 1 to 8 carbon atoms, which is interrupted by a hetero atom. $R^4$'s each independently represent an alkyl group having 1 to 8 carbon atoms and two $R^4$'s may be combined to form a ring other than an aromatic ring, $R^5$ represents an alkyl group having 1 to 8 carbon atoms, and the alkyl group in $R^1$ to $R^5$ may be branched and have a hetero atom in the chain)

$R^1$ in the formula (1) are each independently preferably an alkyl group having 1 to 4 carbon atoms, and particularly preferably a methyl group.

$R^2$ in the formula (1) are preferably each independently an alkyl group having 1 to 4 carbon atoms, and particularly preferably an ethyl group.

$R^3$ in the formula (1) are each independently preferably a hydrogen atom, an alkyl group having 1 to 4 carbon atoms, or an alkyl group having 1 to 4 carbon atoms, which is interrupted by a hetero atom, more preferably a hydrogen atom or an alkyl group having 1 to 4 carbon atoms, and particularly preferably a hydrogen atom or a methyl group. Further, preferred examples of the hetero atom include an oxygen atom, a sulfur atom, and a nitrogen atom.

$R^4$ in the formula (2) are each independently an alkyl group having 1 to 4 carbon atoms, and particularly preferably a methyl group.

$R^5$ in the formula (2) are each independently an alkyl group having 1 to 4 carbon atoms, and particularly preferably a methyl group.

The alkyl group in $R^1$ to $R^5$ may be branched or have hetero atoms in the chain. Examples of the alkyl group having hetero atoms in the chain include —$CH_2CH_2(OCH_2CH_2)_2OCH_3$ and —$CH_2CH_2OCH_2CH_2$.

Among these, as the compound represented by the formula (1), a compound represented by the following formula (3) or (4) is preferred, a compound represented by the following formula (4) is particularly preferred, and also, as the compound represented by the formula (2), a compound represented by the following formula (5) is preferred.

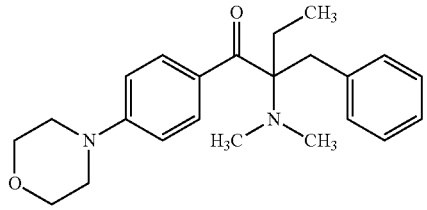

(3)

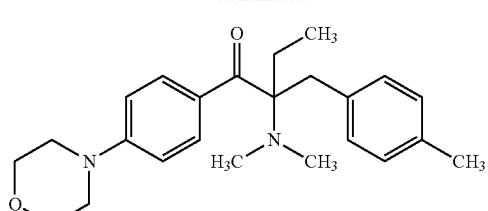

(4)

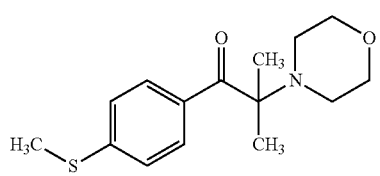

(5)

For the ink composition of the present invention, the content of the compound represented by the formula (1) is preferably from 0.3 to 10% by mass, and more preferably from 2 to 5% by mass, based on the total mass of the ink composition <Thioxanthone Compound>

The ink composition preferably contains a thioxanthone compound.

Furthermore, the ink composition preferably contains the thioxanthone compound in the amount of 0.3 to 5% by mass, and more preferably 1 to 5% by mass, based on the total mass of the ink composition.

As the thioxanthone compound, a compound represented by the formula (b-1) is preferred.

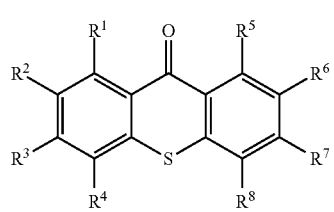

(b-1)

(in the formula (b-1), $R^1$ to $R^8$ each independently represent a hydrogen atom, an alkyl group, a halogen atom, a hydroxyl group, a cyano group, a nitro group, an amino group, an alkylthio group, an alkylamino group (including the cases of a monoalkyl-substituted amino group and a dialkyl-substituted amino group), an alkoxy group, an alkoxycarbonyl group, an acyloxy group, an acyl group, a carboxyl group, or a sulfo group).

The number of carbon atoms of an alkyl moiety in each of the alkyl group, the alkylthio group, the alkylamino group, the alkoxy group, the alkoxycarbonyl group, the acyloxy group, and the acyl group is preferably 1 to 20, more preferably 1 to 8, and still more preferably 1 to 4.

Two of $R^1$ to $R^8$ that are adjacent to each other may be combined with each other to form a ring. In the case where they form a ring, examples of the ring structure include 5- or 6-membered aliphatic or aromatic rings, they may be heterocycles containing elements other than carbon atoms, and rings thus formed may be further combined to form a dinuclear ring, for example, a fused ring. These ring structures may further have a substituent. Examples of the substituent include a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group, and a sulfo group. Examples of the hetero atom when the ring structure thus formed is a heterocycle include N, O, and S.

Examples of the thioxanthone compound include thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenyl sulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-arylthioxanthone-3,4-dicarboximide, n-octylthioxanthone-3,4-dicarboximide, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride.

Among these, from the viewpoint of availability and curability, 2,4-diethylthioxanthone, 2-isopropylthioxanthone, and 4-isopropylthioxanthone are more preferred, and 2,4-diethylthioxanthone is particularly preferred.

<Acylphosphine Compound>

The ink composition preferably contains an acylphosphine compound.

Furthermore, the content of the acylphosphine compound is preferably from 1 to 15% by mass, based on the total mass of the ink composition.

Furthermore, the acylphosphine compound in the ink composition preferably includes a monoacylphosphine compound, or more preferably only a monoacylphosphine compound, from the viewpoints of color of a cured film.

The acylphosphine compound is not particularly limited and a known one may be used, but preferred examples of the acylphosphine compound include the acylphosphine oxide compounds described in Paragraph Nos. 0080 to 0098 of JP2009-096985A, and among these, a compound having a structure represented by the formula (b-2-1) or the formula (b-2-2) in the structure of the compound is preferred.

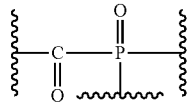

(b-2-1)

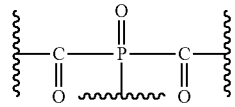

(b-2-2)

(wherein the wave parts represent positions having bonds with other structures).

As the acylphosphine oxide compound, a compound represented by the formula (b-2-3) or the formula (b-2-4) is particularly preferred.

(in the formula (b-2-3), $R^6$, $R^7$, and $R^8$ each independently represent an aromatic hydrocarbon group, which may have a methyl group or an ethyl group as a substituent).

With regard to a monoacylphosphine oxide compound represented by the formula (b-2-3), it is preferable that $R^6$ to $R^8$ be phenyl groups, which may have a methyl group as a substituent, and it is more preferable that $R^7$ and $R^8$ be phenyl groups and $R^6$ be a phenyl group having 1 to 3 methyl groups.

Among these, as the monoacylphosphine oxide compound represented by the formula (b-2-3), 2,4,6-trimethylbenzoyl-diphenylphosphine oxide (DAROCUR TPO: manufactured by Ciba Japan K. K., LUCIRIN TPO manufactured by BASF) is preferred.

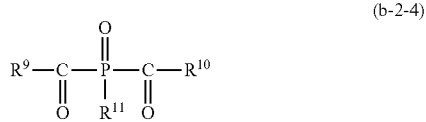

(in the formula (b-2-4), $R^9$, $R^{10}$, and $R^{11}$ each independently represent an aromatic hydrocarbon group, which may have a methyl group or an ethyl group as a substituent).

With regard to a bisacylphosphine oxide compound represented by the formula (b-2-4), it is preferable that $R^9$ to $R^{11}$ be phenyl groups, which may have a methyl group as a substituent, and it is more preferable that $R^{11}$ be a phenyl group and $R^9$ and $R^{10}$ be phenyl groups having 1 to 3 methyl groups.

Among these, as the bisacylphosphine oxide compound represented by the formula (b-2-4), bis(2,4,6-trimethylbenzoyl)phenylphosphine oxide (IRGACURE 819, manufactured by Ciba Japan K. K.) is preferred The content of the acylphosphine compound in the ink composition is preferably from 1 to 15% by mass, more preferably from 1 to 10% by mass, and still more preferably from 5 to 10% by mass, based on the total mass of the ink composition, from the viewpoints of curability.

Moreover, as the radical polymerization initiator, for examples, those described in Paragraph Nos. 0090 to 0116 of JP2009-185186A may also be suitably used.

In addition, as the radical polymerization initiator, a thiochromanone compound may be used, and examples thereof include the compounds described in Paragraph Nos. 0064 to 0068 of JP2010-126644A.

The total content of the radical polymerization initiator (Component B) in the ink composition that can be used in the present invention is preferably from 1.5 to 25% by mass, more preferably from 2 to 20% by mass, still more preferably from 5 to 18% by mass, and particularly preferably from 5 to 15% by mass, based on the total mass of the ink composition, from the viewpoints of the curability and the color of a cured film Colorant (Component C)

The ink composition of the present invention preferably contains a colorant in order to improve the visibility of an image area formed.

The colorant is not particularly limited, but a pigment and an oil-soluble dye that have excellent weather resistance and rich color reproduction are preferred, and a colorant may be selected from known colorants such as a soluble dye, and used. As the colorant, a compound that does not function as a polymerization inhibitor is preferably selected, from the viewpoint that the sensitivity of the curing reaction by active radioactive rays or the like should not be degraded.

The pigment that can be used in the present invention is not particularly limited but, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 150, 153, 154, 155, 157, 166, 167, 168, 180, 185, or 193; as a black pigment, Pigment Black 7, 28, or 26; as a white pigment, Pigment White 6, 18, or 21, or the like may be used according to the intended application.

In the present invention, a disperse dye may be used in a range that enables it to be dissolved in a hydrophobic organic solvent. Disperse dyes generally include water-soluble dyes, but in the present invention, it is preferable for the disperse dye to be used in a range such that it be dissolved in a hydrophobic organic solvent.

Specific preferred examples of the disperse dye include C. I. Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C. I. Disperse Green 6:1 and 9.

After the colorant is added to the ink composition, the colorant is preferably dispersed in the ink composition to an appropriate degree. For dispersion of the colorant, for example, any of various dispersing machines such as a ball mill, a sand mill, an attritor, a roll mill, an agitator, a Henschel mixer, a colloidal mill, an ultrasonic homogenizer, a pearl mill, a wet type jet mill, and a paint shaker may be used.

In the preparation of an ink composition, the colorant may be added directly to the ink composition together with other components. Further, in order to improve dispersibility, it may be added in advance to a solvent or a dispersing medium such as a polymerizable compound used in the present invention, homogeneously dispersed or dissolved, and then blended into the ink composition.

In the present invention, in order to avoid the problem of the solvent resistance being degraded when the solvent remains in the cured image and the VOC (Volatile Organic Compounds) problem of the residual solvent, it is preferable to add and in advance the colorant to the dispersing medium such as the polymerizable compound, and blend them. Further, as a polymerizable compound used as the dispersing medium of the colorant, it is preferable in terms of dispersion suitability to select a monomer having the lowest viscosity. The colorants may be used by appropriately selecting one type or two or more types thereof according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle diameter of colorant particles is preferably 0.005 to 0.5 μm, more preferably 0.01 to 0.45 μm, and still more preferably 0.015 to 0.4 μm. It is preferred for the colorant to control its particle size, since clogging of a head nozzle can be suppressed and the storage stability, transparency, and curing sensitivity of the ink composition can be maintained.

The content of the colorant in the ink composition is appropriately selected according to the color and the intended purpose, and is preferably 0.01 to 30% by mass relative to the mass of the entire ink composition.

The average particle diameter of the colorant particle can be measured by a dynamic light scattering method using FPAR-1000 (manufactured by Otsuka Electronics Co., Ltd.).

In addition to the essential Components A, B, and C, Component D (dispersant), Component E (polymerization inhibitor), and Component F (surfactant), which may be arbitrarily blended into the ink composition will be described below.

Dispersant (Component D)

The ink composition of the present invention preferably contains a dispersant (Component D). In particular, when the pigment is used, the ink composition preferably contains a dispersant in order to stably disperse the pigment in the ink composition.

As the dispersant, a polymeric dispersant is preferred. The "polymeric dispersant" in the present invention means a dispersant having a weight average molecular weight of 1,000 or more.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), DISPERSE AID 6, DISPERSE AID 8, DISPERSE AID 15, and DISPERSE AID 9100 (manufactured by San Nopco Ltd.); various types of SOLSPERSE dispersants such as SOLSPERSE 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by ADEKA Corporation), IONET S-20 (manufactured by Sanyo Chemical Industries, Ltd.), and DISPARLON KS-860, 873SN, and 874 (polymeric dispersant), #2150 (aliphatic polycarboxylic acid), and #7004 (polyether ester type) (manufactured by Kusumoto Chemicals, Ltd.).

The content of the dispersant in the ink composition is appropriately selected according to the intended purpose, and is preferably from 0.05 to 15% by mass based on the total mass of the ink composition.

Polymerization Inhibitor (Component E)

The ink composition of the present invention preferably contains a polymerization inhibitor from the viewpoint of enhancing the storage stability.

When the ink composition is used as an ink jet recording ink composition, it is preferably heated in the range of 25 to 80° C. to make it less viscous and then discharged, and in order to prevent clogging of a head due to thermal polymerization, it is preferable to add a polymerization inhibitor.

Examples of the polymerization inhibitor include nitroso-based polymerization inhibitors, hydroquinone, benzoquinone, p-methoxyphenol, TEMPO, TEMPOL, and cupferron Al.

Specific examples of the nitroso-based polymerization inhibitors that are preferably used in the present invention are shown below, but not limited thereto. Further, the compound at the end on the left side below is cupferron Al.

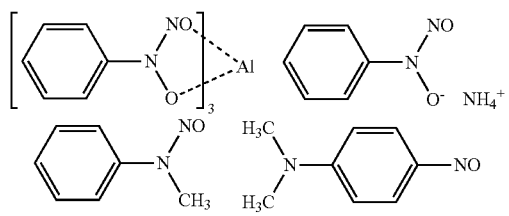

Examples of commercial products of the nitroso-based polymerization inhibitors include FIRSTCURE ST-1 (manufactured by Chem First Corporation).

The content of the polymerization inhibitor in the ink composition is preferably from 0.01 to 1.5% by mass, more preferably from 0.1 to 1.0% by mass, and still more preferably from 0.2 to 0.8% by mass, based on the total mass of the ink composition. Within the above-described range, it is possible to suppress polymerization during storage and prevent clogging of ink jet nozzles during the preparation of the ink composition.

Surfactant (Component F)

A surfactant may be added to the ink composition of the present invention to provide long-term stable dischargeability.

However, from the viewpoints of glossiness and suppression of stripe patterns, it is preferable that the ink composition of the present invention do not contain a silicone-based surfactant and a fluorine-based surfactant, or the total content of the silicone-based surfactant and the fluorine-based surfactant be more than 0% by mass and 0.03% by mass or less, based on the total mass of the ink composition; it is more preferable that the ink composition of the present invention do not contain a silicone-based surfactant and a fluorine-based surfactant, or the total content of the silicone-based surfactant and the fluorine-based surfactant be more than 0% by mass and 0.005% by mass or less, based on the total mass of the ink composition; and it is still more preferable that the ink composition of the present invention do not contain a silicone-based surfactant and a fluorine-based surfactant.

Further, examples of the surfactant other than the silicone-based and fluorine-based surfactants include those described in JP1987-173463A (JP-S62-173463A) and JP1987-183457A (JP-562-183457A). Examples thereof include anionic surfactants such as a dialkyl sulfosuccinate salt, an alkylnaphthalene sulfonic acid salt, or a fatty acid salt, nonionic surfactants such as a polyoxyethylene alkyl ether, a polyoxyethylene alkyl allyl ether, an acetylene glycol, or a polyoxyethylene-polyoxypropylene block copolymer, and cationic surfactants such as an alkylamine salt and a quaternary ammonium salt.

<Other Components>

The ink composition of the present invention may contain, if necessary, in addition to the above-mentioned components, a co-sensitizer, a UV absorber, an antioxidant, an anti-fading agent, a conductive salt, a solvent, a polymer compound, a basic compound, a leveling additive, a matting agent, a polyester resin in order to adjust the film physical properties, a polyurethane resin, a vinyl resin, an acrylic resin, a rubber resin, wax, or the like. These are described in JP2009-185186A and may be used in the present invention as well.

<Physical Properties of Ink>

While taking into consideration dischargeability, the ink composition of the present invention has a viscosity at 25° C. of preferably 40 mPa·s or less, and more preferably 15 to 30 mPa·s. Furthermore, the viscosity of the ink composition at the discharge temperature (preferably from 25 to 80° C., and more preferably from 25 to 50° C.) is preferably from 3 to 15 mPa·s, and more preferably from 3 to 13 mPa·s. With regard to the ink composition, it is preferable that its composition ratio be appropriately adjusted so that the viscosity is in the above-mentioned range. When the viscosity at room temperature (25° C.) is set to be high, even when a porous recording medium is used, penetration of the ink composition into the recording medium can preferably be prevented, and uncured monomer can preferably be reduced. In addition, ink spreading when ink droplets of the ink composition have landed can be suppressed, and as a result, the image quality is preferably improved.

The static surface tension at 25° C. of the ink composition of the present invention is preferably from 25 to 40 mN/m. When recording is carried out on any of various recording media such as polyolefins, PET, coated paper, and non-coated paper, from the viewpoints of spreading and penetration, the static surface tension is preferably 25 mN/m or more, and from the viewpoints of wettability, the static surface tension is preferably 40 mN/m or less.

In the present invention, the ink composition is a radioactive ray-curable ink composition. The "radioactive ray" in the present invention is not particularly limited as long as it is a radioactive ray that can provide energy that enables an initiating species to be generated in the ink composition when irradiated, and broadly includes α rays, γ rays, X rays, ultraviolet rays (UV), visible light, and an electron beam. Among these, ultraviolet rays and an electron beam are preferred from the viewpoint of the curing sensitivity and the availability of a device, and ultraviolet rays are particularly preferred. Accordingly, as the ink composition of the present invention, an ink composition that is curable when irradiated with ultraviolet rays as radioactive rays is preferred.

In particular, the ink composition of the present invention is preferably one that is cured with high sensitivity with respect to ultraviolet rays with which the ink composition has a high illuminance of 10 to 2,000 mW/cm$^2$ on a discharged recording medium surface, using a light-emitting diode that generates ultraviolet rays at a light-emitting peak wavelength in the range of 380 to 420 nm.

Furthermore, the ink composition of the present invention is a radioactive ray-curable ink composition, and since the ink composition of the present invention is cured after being applied onto a recording medium, it is preferable that it do not contain a highly volatile solvent and be solvent-free. This is because if a highly volatile solvent remains in the cured ink composition in a cured ink image, the solvent resistance is degraded, or the VOC (Volatile Organic Compounds) problem based on volatile solvent occurs.

(Ink Set)

The ink composition of the present invention can be used as an ink set including a colorant having other color, such as a yellow ink composition, a magenta ink composition, a cyan ink composition, and a black ink composition.

(Ink Container)

With the ink container of the present invention, the above-mentioned ink composition is encapsulated in an ink container having an air-impermeable structure (an ink container through which the air is practically not permeated).

Here, the ink container having an air-impermeable structure that is used to encapsulate the ink composition air-tightly includes only a material through which the air is practically not permeated.

The "material through which the air is practically not permeated" is preferably a material through which oxygen is practically not permeated (also referred to as an "oxygen-impermeable material") is preferred, and means one having an oxygen permeation rate of the ink container material of 1.0 cc/m$^2$·atm·24 hrs or less.

In the present invention, the ink container is formed of an oxygen-impermeable material. Preferred examples of the material of the ink container include a silica deposited multilayer structure film, an alumina deposited multilayer structure film, and an EVAL film in which polyethylene (PE) is laminated on the an ethylene/vinyl alcohol copolymer (trademark: EVAL). Specific examples of the material of the ink container of the present invention include a multilayer structure film in which films of polyamide, aluminum alloy, polyethylene terephthalate, and polyolefin are laminated in this order. Preferred examples of the shape of the ink container of the present invention include bag-shaped bodies formed by heat-sealing these oxygen-impermeable materials. Further, the bag-shaped bodies formed by the laminated films may be stored in the cover container (for example, a cubic cover container). Further, the ink container of the present invention is preferably an ink container (bag-shaped body container) provided with the bag-shaped body and a supply unit in which the ink composition can be eluted from the bag-shaped body. Here, an ink container (bag-shaped body container) provided with the bag-shaped body formed with a film and a supply unit in which the ink composition can be eluted from the bag-shaped body may be referred to as an ink pack.

The container itself that is used for the ink container of the present invention can be produced by an ordinary method or commercially available ones can also be used. Among these, the ink container of the present invention is preferably an ink container (bag-shaped body container) provided with the bag-shaped body formed with a film and a supply unit in which the ink composition can be eluted from the bag-shaped body, that is, an ink pack.

The bag-shaped body can be typically produced by a method in which a polyolefin-based film is rim-sealed by a common method to mold a bag-shaped polyolefin-based film in a bag shape. The film as used herein preferably has a thickness of 50 to 300 μm from the viewpoint of mechanical strength.

The oxygen-impermeable material that constitutes the ink container is preferably used in a polyolefin film, for example, a polyethylene film, which has heat-seal suitability in the innermost layer.

FIG. 1 is an exploded perspective view showing an example of the ink containers that can be suitably used in the present invention.

In an ink cartridge 130, an ink container (ink pack) 133 of a bag-shaped body is accommodated in the space surrounded by a case main body 132 made of plastics and a case lid 131. In the ink container (ink pack) 133, a supply unit 134 that is a tubular member is attached to one end of a bag-shaped body 141 and the ink composition is supplied to the outside.

The tip of the supply unit 134 is exposed to the outside of the case from a cutout 140 provided in the wall on one surface of the case main body 132, and in the state where the ink cartridge 130 is attached to a cartridge holder (not shown), the ink composition is supplied into the main body of a printer through a supply unit 134. Further, in the state where the ink cartridge 130 is not mounted, the opening of the supply unit 134 is preferably closed by a valve provided in the inner part.

(Ink Jet Recording Method and Printed Material)

As mentioned above, the ink jet recording method of the present invention includes (a) a degassing step of degassing the dissolved oxygen between the ink container that stores the ink composition of the present invention and ink-discharging nozzles, and (b) a discharging step of discharging the degassed ink composition from the nozzles. Here, the (a) degassing step is as described above.

The ink jet recording method of the present invention preferably further includes, subsequently to the discharging step, (c) a step of irradiating an active radioactive ray to the discharged ink composition using an ultraviolet ray light-emitting diode to cure the ink composition. The ink jet recording method of the present invention is preferably a method for forming an image on a recording medium with the cured ink composition by incorporation of the steps (a) to (c) above.

The ultraviolet ray light-emitting diode in the step (c) preferably has a light-emitting peak in the range of 380 to 420 nm and a maximum illuminance of 10 to 2,000 mW/cm$^2$ on a recording medium.

In addition, the printed material that can be obtained by the present invention is a printed material obtained by one or more of the ink compositions of the present invention, and preferably a printed material recorded by the ink jet recording method of the present invention.

<Step (b)>

First, the step (b) in which the degassed ink composition of the present invention is discharged onto a recording medium (hereinafter also referred to as an image-forming step) will be described.

The recording medium used in the present invention is not particularly limited, and a known recording medium may be used. Examples thereof include paper, paper laminated with plastics (for example, polyethylene, polypropylene, and polystyrene), a metal plate (for example, aluminum, zinc, and copper), a plastic film (for example, polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinylacetal), and a paper or plastic film laminated or vapor-deposited with the above metal. In the present invention, as the recording medium, a non-absorbing recording medium is preferred, and among them, a plastic film or paper is more preferred.

The ink jet recording device used in the image-forming step is not particularly limited, and any one may be arbitrarily selected from known ink jet recording devices that can accomplish desired resolution, and used. That is, with any of known ink jet recording devices including commercially available products, the ink composition can be discharged onto a recording medium in the step (b) in the ink jet recording method of the present invention.

Examples of the ink jet recording device that can be used in the present invention include a device including an ink supply system, a temperature sensor, and an active radioactive ray source.

The ink supply system is constituted with, for example, a main tank containing the ink composition, a supply pipe, an ink composition supply tank immediately before an ink jet head, a filter, and a piezo system ink jet head. The piezo system ink jet head may be driven so as to discharge a multisize dot of preferably 1 to 100 pL, more preferably 3 to 42 pL, and still more preferably 8 to 30 pL, at a resolution of preferably 300×300 to 4,000×4,000 dpi, and more preferably 400×400 to 1,600×1,600 dpi. Here, dpi as mentioned in the present invention refers to the number of dots per 2.54 cm.

The ink jet head used in the ink jet recording method of the present invention is preferably an ink jet head having a nozzle plate that has been subjected to a non-repellent liquid treatment. As a nozzle plate, a known one may be used, but, for example, the ink jet heads described in the specifications of U.S. Pat. No. 7,011,396A, US2009/0290000A, and the like may be preferably used. The nozzle plate is mounted on, for example, an on-demand ink jet head by a piezo driving system manufactured by FUJIFILM Dimatix, Inc. Specific examples thereof include S-class and Q-class Sapphires.

The nozzle plate has preferably at least a part on the side facing the recording medium that has been subjected to a non-repellent liquid treatment (ink-philic treatment). As the non-repellent liquid treatment method, a known method may be used and is not limited, but examples thereof include (1) a method in which the surface of a nozzle plate made of silicon is thermally oxidized to form a silicon oxide film, (2) a method in which an oxide film of silicon or elements other than silicon is formed by oxidation or by sputtering, and (3) a method in which a metal film is formed. For the details on these methods, reference may be made to the specification of US2010/0141709A.

The ink jet head preferably has a productivity of 200 ng*kHz or more. The productivity means a mass of the ink composition discharged per second as calculated with the mass of the ink composition per dot×number of nozzles× frequency.

Since the ink composition has high curing sensitivity and is capable of curing in a short period of time, an image can be formed without deterioration of the image quality, even using an image forming device having a productivity which is 200 ng*kHz or more. The productivity is more preferably from 200 to 800 ng*kHz, still more preferably from 300 to 600 ng*kHz, and particularly preferably from 400 to 600 ng*kHz.

In the present invention, since it is preferable for the ink composition to be discharged at a constant temperature, an image-forming device in which a section from the head portion and/or the ink composition supply tank to the ink jet head can be warmed is preferably used. A method of controlling the temperature is not particularly limited, but it is preferable to provide, for example, temperature sensors at a plurality of pipe section positions, and control the heating according to the ink composition flow rate and the temperature of the surroundings. The temperature sensors may be provided on the ink composition supply tank and in the vicinity of the nozzles of the ink jet head. Further, the head unit that is to be heated is preferably thermally shielded or insulated such that that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The radioactive ray-curable ink composition such as the ink composition used in the present invention generally has a viscosity that is higher than that of a normal ink composition or a water-based ink composition used for an ink jet recording ink composition, and variation in viscosity due to a change in temperature at the time of discharge is large. Viscosity variation in the ink composition has a large effect on changes in the liquid droplet size and changes in the liquid droplet discharge speed, and thus causes the image quality to be degraded. It is therefore preferable to maintain the ink composition discharge temperature to be as constant as possible. Therefore, the temperature from the head portion and/or ink composition supply tank to the ink jet head portion, that is, the control range for the temperature during discharge of the ink composition is preferably ±5° C. of a set temperature, more preferably ±2° C. of the set temperature, and still more preferably ±1° C. of the set temperature.

<Step (c)>

Next, the step (c) of irradiating active radioactive rays to the discharged ink composition using an ultraviolet ray light-emitting diode to cure the ink composition (hereinafter also referred to as a curing step) will be described.

The ink composition discharged onto the recording medium is cured by irradiation with ultraviolet rays. This is due to a polymerization-initiating species such as a radical and the like being generated by decomposition of the polymerization initiator included in the ink composition in the present invention by irradiation with ultraviolet rays, the initiating species functioning so as to make a polymerization reaction of a polymerizable compound take place and to promote the polymerization reaction. In this process, if a sensitizer is present together with the polymerization initiator in the ink composition, the sensitizer in the system absorbs ultraviolet rays, becomes excited, and promotes decomposition of the polymerization initiator by contact with the polymerization initiator, thus enabling a curing reaction with higher sensitivity to be achieved.

In the curing step, as a ray source for irradiation with ultraviolet rays, a light-emitting diode (UV-LED) that generates ultraviolet rays having a light-emitting peak wavelength in the range of 360 to 420 nm is preferably used.

As the UV-LED, for example, Nichia Corporation has marketed a violet LED having a wavelength of the main emission spectrum of between 365 nm and 420 nm. Further, other violet LEDs are available and irradiation may be carried out with irradiation of a different ultraviolet ray bandwidth.

Here, the light-emitting peak wavelength of the ultraviolet rays used in the present invention depends on the absorption characteristics of the sensitizer, but is preferably from 360 to 420 nm. When the light-emitting peak wavelength is 360 nm or more, the stability is excellent, whereas when the light-emitting peak wavelength is 420 nm or less, the curability is excellent, which is thus preferable. The light-emitting peak wavelength of the ultraviolet rays is preferably from 360 to 410 nm, and more preferably from 360 to 405 nm, from the viewpoints of curability.

The ink composition used in the present invention has excellent curability even with respect to the ultraviolet rays having a long-wavelength light-emitting peak than that of the ultraviolet rays used for curing in the related art.

The stability of the ink composition in the ink supply path of the ink jet recording device does has a less problem in an ink composition having sensitivity to shortwave ultraviolet light relatively corresponding to a metal halide light source until now, but in recent years, the ink composition also has sensitivity to long-wavelength ultraviolet light, corresponding to a longer wavelength and a lower output of the irradiation light source such as an LED light source and has high sensitivity, and therefore improvement of indoor light resistance is becoming important. Further, by increasing the stability of an ink tube path, a tube having a low light shielding property can be used instead of an expensive highly light shielding tube, and a system cost can also be reduced.

Moreover, according to the ink jet recording method of the present invention, it is possible to spread the wettability of the ink composition on a recording medium by changing the degree of degassing and change the shape of the dot surfaces. When the degree of degassing is low, the sensitivity becomes lower, the dot is wet and spreads, and the pile height decreases. On the other hand, when the degree of degassing is high, the sensitivity becomes higher, the dot is not wet and does not spread, and the pile height increases. Thus, an image with a gloss type can be obtained in the former, whereas an image with a matte type can be obtained in the latter.

Since the degassed ink composition in the present invention has sufficient sensitivity, it is sufficiently cured even with active radioactive rays having a low output. Specifically, it is sufficiently cured at a maximum illuminance in the range of 10 to 2,000 mW/cm$^2$ on the recording medium surface.

When the maximum illuminance on the recording medium surface is 10 mW/cm$^2$ or more, the curability is excellent and there is no occurrence of tackiness of the image and degradation of image quality. Further, when the maximum illuminance on the recording medium surface is 2,000 mW/cm$^2$ or less, curing of the discharged ink composition does not proceed rapidly and degradation of image quality due to formation of the irregularities on the image surface is suppressed.

The maximum illuminance on the recording medium surface is preferably from 650 to 1,800 mW/cm$^2$, and more preferably from 700 to 1,700 mW/cm$^2$, from the viewpoints of the image quality and the productivity.

In the ink jet recording method of the present invention, the ink composition is irradiated with such ultraviolet rays for preferably 0.01 to 2 seconds, more preferably 0.1 to 1.5 seconds, and still more preferably 0.3 to 1 second.

The irradiation conditions and basic irradiation methods for active radioactive rays are disclosed in JP1985-132767A (JP-S60-132767A). Specifically, a light source is provided on either side of a head unit including an ink composition discharge device, and the head unit and the light source are made to scan by a so-called shuttle system.

Thus, by using a small and light UV-LED as an active radioactive ray source provided in a driving unit, a smaller ink jet recording device and energy saving can be promoted and an image can be formed with high productivity. Further, since UV-LED has excellent variability in the exposure conditions, suitable exposure conditions can be set according to the ink compositions and an image can be formed with high productivity.

Irradiation with active radioactive rays is carried out after a certain time (for example, 0.01 to 0.5 seconds, preferably 0.01 to 0.3 seconds, and more preferably 0.01 to 0.15 seconds) has elapsed from when the ink composition has landed on the recording medium. By controlling the time from ink composition landing to the irradiation so as to be a minimum in this way, it becomes possible to prevent the ink composition that has landed on a recording medium from spreading before being cured. Furthermore, even when the ink composition is discharged onto a porous recording medium, it can be exposed before it penetrates to a deep area of that the light source cannot reach, and therefore, it is preferably possible to inhibit the monomers from remaining unreacted.

Moreover, curing may be completed using another light source that is not driven. As an irradiation method, a method employing an optical fiber and a method in which a collimated light is incident on a mirror surface provided on a head unit side face, and a recorded area is irradiated with UV light are disclosed, and for this curing method, the ink jet recording method of the present invention can also be applied.

In the curing step, the energy provided by the light-emitting diode, that is, the energy (integrated light amount) provided to the ink composition on the recording medium by irradiation with ultraviolet rays is preferably from 100 to 1,000 mJ/cm$^2$, more preferably from 150 to 800 mJ/cm$^2$, and still more preferably from 200 to 700 mJ/cm$^2$. With the above-described ranges, both of productivity and curability can be satisfied, which is thus preferable.

In the ink jet recording method of the present invention, it is also preferable to form at least part of the image in the printed material by repeating the image-forming step (b) and the curing step (c) at least twice, after the degassing step of the ink composition (a) since an image having excellent glossiness can be obtained.

Examples of the embodiment in which at least part of the image in the printed material is formed by repeating the image-forming step (b) and the curing step (c) at least twice include an embodiment in which with regard to a one-color, the step (b) and the step (c) are carried out each once to form a color image, an embodiment in which with regard to a single color image, the step (b) and the step (c) are repeated twice or more to form a single color image, and an embodiment in which with regard to a one-color in a color image, the step (b) and the step (c) are repeated twice or more to form a one-color image, and further, with regard to the color other than the color image, similarly, the step (b) and the step (c) are repeated twice or more to form a color image.

By employing such an ink jet recording method as described above, it is possible to maintain a uniform dot diameter for a landed ink composition even for various recording media having different surface wettability, thereby improving the image quality. Further, in order to obtain a color image, it is preferable to superimpose colors in order from those with a high lightness. By superimposing ink compositions in order from one with high lightness, it is easy for active radioactive rays irradiated to reach a lower ink composition, the curing sensitivity is good, the amount of residual monomers is reduced, and an improvement in adhesion can be expected. Furthermore, with the irradiation of the active radioactive rays, it is possible to discharge all colors and then expose them at the same time, but it is preferable to expose one color at a time from the viewpoint of promoting curing.

In the ink jet recording method of the present invention, an ink set including a combination of plural ink compositions of the present invention is preferably used. The order in which colored ink compositions are discharged is not particularly limited, but it is preferable to apply to a recording medium from a colored ink composition having a high lightness.

Specifically, for example, the ink compositions are preferably applied on the recording medium in the order of yellow, cyan, magenta, and black. Furthermore, when a white ink composition is used, it is preferably applied on the recording medium in the order of white, yellow, cyan, magenta, and black.

When an ink set including at least a total of seven colors, that is, light cyan and light magenta ink compositions, and cyan, magenta, black, white, and yellow dark ink compositions is used, it is preferably applied on the recording medium in the order of white, light cyan, light magenta, yellow, cyan, magenta, and black. In this way, the ink composition may be cured by irradiation with ultraviolet rays with high sensitivity to form an image on the surface of the support.

EXAMPLES

Hereinbelow, the present invention will be explained in more detail with reference to Examples and Comparative Examples. However, the present invention should not be construed as being limited by these Examples. Further, the "parts" in the description below means "parts by mass" and the "%" in the description below means "% by mass" unless otherwise particularly specified.

<Preparation of Magenta Mill Base>

| | |
|---|---|
| Magenta pigment: CINQUASIA MAGENTA RT-355D (manufactured by Ciba Japan K. K.) | 30 parts by mass |
| SR9003 (propoxylated (2) neopentyl glycol diacrylate (compound obtained by diacrylating a 2-mole adduct of neopentyl glycol propylene oxide), manufactured by Sartomer Company Inc.) | 49 parts by mass |
| SOLSPERSE 32000 (dispersant manufactured by Noveon) | 20 parts by mass |
| FIRSTCURE ST-1 (polymerization inhibitor, manufactured by Chem First Corporation) | 1 part by mass |

The components above were stirred to obtain a magenta mill base. Further, preparation of the pigment mill base was carried out by dispersing the components using a Motor Mill M50 disperser (manufactured by Eiger Machinery, Inc.) with zirconia beads having a diameter of 0.65 mm at a peripheral speed of 9 m/s for 8 hours.

<Preparation of Black Mill Base>

| | |
|---|---|
| Black pigment: SPECIAL BLACK 250 (manufactured by Ciba Japan K. K.) | 30 parts by mass |
| SR9003 | 49 parts by mass |
| SOLSPERSE 32000 | 20 parts by mass |
| FIRSTCURE ST-1 | 1 part by mass |

The components above were stirred under the same dispersion conditions as the preparation of the magenta mill base to obtain a black mill base.

<Method for Manufacturing Ink Composition>

The materials described in Tables 1 and 3 were mixed and stirred to prepare the respective ink compositions, thereby obtaining the respective ink compositions of the Examples and the Comparative Examples. Further, the numeral values in Tables represent the blending amounts (parts by mass) of the respective components.

<Method for Adjusting Dissolved Oxygen Content>

The prepared ink composition was bubbled with oxygen at a speed of 0.5 L/min at an ambient temperature and 1 atm, or at 0° C. and 2 atm to adjust the dissolved oxygen content to 9 mg/L or more. Further, when reducing the dissolved oxygen content, the ink composition was bubbled with nitrogen gas at a speed of 0.5 L/min to adjust the dissolved oxygen content to a desired value. The dissolved oxygen content was measured using the Orbisphere Oxygen System Model 3600 and Orbisphere Oxygen Sensor Model 31130 (both manufactured by Hach Ultra Co., Ltd.).

<Method for Charging Ink Composition into Ink Container>

An ink pack was obtained by charging the ink composition manufactured as above into an aluminum deposited multilayer structure container (pack) formed by laminating polyamide, aluminum alloy, polyethylene terephthalate, and polyolefin (innermost layer) films in this order without encapsulating a gas. The oxygen penetration rate of the aluminum deposited multilayer structure container was 0.5 cc/m²·atm·24 hrs or less, through which oxygen does not practically penetrate.

<Evaluation of Storage Stability>

After the respective ink packs were put into a thermostatic bath set at 60° C. and left to stand for 28 days, the particle diameter variation in the ink composition and the viscosity variation in ink compositions were evaluated.

—Method for Measuring Viscosity—

The viscosity of the ink compositions in the present Examples was measured using an E type viscometer: TV-25 (manufactured by Toki Sangyo Co., Ltd.) at a rotation speed of a rotor of 20 rpm under the condition of 25° C.

—Method for Measuring Particle Diameter—

The particle diameter of the ink composition in the present Examples was measured using FPAR-1000 (manufactured by Otsuka Electronics Co., Ltd.). In the measurement, 2-butanone was used as a diluent solvent for adjustment of the concentration.

The increment of the viscosity/particle diameter after one month was evaluated as "A" when it was less than 110%, as "B" when it was less than 125%, as "C" when it was 125% or more and less than 140%, and as "D" when it was 140% or more. From the viewpoint of dischargeability, A and B are in the range for practical use.

<Evaluation of Curing Sensitivity>

Recording on a recording medium was carried out using an ink jet recording experiment device having a piezo type ink jet head Q-class Sapphire QS-256/10 (manufactured by FUJIFILM DIMATIX, Inc., number of nozzles of 256, liquid droplet amount 10 pL, 50 kHz). The ink supply system includes an ink pack, a supply tube, a degassing filter SEPAREL EF-G2 (manufactured by DIC Corporation), an ink supply tank immediately before the ink jet head, a degassing filter, and a piezo type ink jet head, and the degassing pressure in the degassing filter portion was reduced to 0.1 atm.

Using the above apparatus, an ink composition was loaded as droplets onto a sheet made of polyvinyl chloride and irradiated by being passed under a light beam of the fixed light source to cure the ink, and thereby a printed material was obtained. As the light source for curing, a HAN250NL High-Cure mercury lamp (manufactured by GS Yuasa Corporation) (light source I) or a light-emitting diode (UV-LED, NC4U134 manufactured by Nichia Corporation, wavelength 385 nm) (light source II) was used. The illuminance on the surface in both light sources was fixed to 0.8 W/cm² and intermittently exposed to apply an exposure amount of 1.0 J/cm². In the present Examples, exposure was carried out about 0.5 seconds after landing of the ink composition.

The curing sensitivity was defined with the color migration or the presence or absence of tackiness of the surface after printing. The presence or absence of tackiness of the surface of the printed material was evaluated by palpation and the color migration was examined by pressing plain paper (paper for copy C2, manufactured by Fuji Xerox Co., Ltd.) immediately after printing. Less color migration and less tackiness were evaluated as higher curing sensitivity, and the evaluation was carried out using the criteria below.

A: Absence of color migration and tackiness
B: Absence of color migration and practical absence of tackiness
C: Slight presence of color migration and tackiness
D: Presence of color migration and tackiness <Evaluation of Glossiness at 60°>

The dissolved oxygen content during discharge was adjusted by changing the degassing pressure of a degassing filter from 0.1 to 0.9 atm using the printing method above. As the recording medium, Mitsubishi Special Art Paper manufactured by Mitsubishi Paper Mills Ltd. (104 g/m² basis weight) was used. For the images obtained, the glossiness was measured at a measurement angle of 60° using a gloss meter manufactured by Sheen Instruments Ltd. in accordance with JIS Z8741.

A degree of glossiness of 20 or more is evaluated as being glossy and a degree of glossiness of 20 or less is evaluated as being matte.

Furthermore, with the ink of Example 14 and Example 12 in Table 1, an ink jet recording method was carried out modified so as to attain the values of the dissolved oxygen contents after degassing the dissolved oxygen contents described in Table 2. As a result, it could be seen that in addition to the formulation of ink, the gloss at 60° can be adjusted from being glossy to being matte by changing the dissolved oxygen content in the ink jet composition during the discharge, and particularly a degree of glossiness being glossy can be obtained as a technical effect.

Furthermore, the respective components in Tables 1 to 3 are as follows.

NVC: N-Vinylcaprolactam (V-CAP, manufactured by ISP Japan)
NVF: N-Vinylformamide (Beamset 770, manufactured by Arakawa Chemical Industries, Ltd.)
PEA: Phenoxyethyl acrylate (SR339, manufactured by Sartomer Company Inc.)
CTFA: Cyclic trimethylolpropaneformal acrylate (SR531, manufactured by Sartomer Company Inc.)
SA: Stearyl acrylate (SR257, manufactured by Sartomer Company Inc.)
SR9003: Propylene glycol-modified neopentyl glycol diacrylate (SR9003, manufactured by Sartomer Company Inc.)
IBOA: Isobornyl acrylate (SR506, manufactured by Sartomer Company Inc.)
DPGDA: Dipropylene glycol diacrylate (SR508, manufactured by Sartomer Company Inc.)
CN964A85: Bifunctional aliphatic urethane acrylate (including 15% by mass of tripropylene glycol diacrylate, manufactured by Sartomer Company Inc.)
CN962: Bifunctional aliphatic urethane acrylate (manufactured by Sartomer Company Inc.)
Irg184: 1-Hydroxy-cyclohexyl-phenyl-ketone (IRGACURE 184, manufactured by Ciba Japan K. K.)
Irg369: 2-Benzyl-2-dimethylamino-1-(4-morpholinophenyl)-butan-1-one (IRGACURE 369, manufactured by Ciba Japan K. K.)
Irg379: 2-(Dimethylamino)-2-[(4-methylphenyl)methyl]-1-[4-(4-morpholinyl)phenyl]-1-butanone (IRGACURE 369, manufactured by Ciba Japan K. K.)

Irg819: Bis(2,4,6-trimethylbenzoyl)phenyl phosphine oxide (IRGACURE 819, manufactured by Ciba Japan K. K.)
TPO: 2,4,6-Trimethylbenzoyldiphenyl phosphine oxide (Darocur TPO, manufactured by Ciba Japan K. K.)
ITX: Isopropylthioxanthone (SPEEDCURE ITX, manufactured by LAMB SON)

ST-1: FIRSTCURE ST-1 (polymerization inhibitor, a mixture of tris(N-nitroso-N-phenylhydroxyamine) aluminum salt (10% by mass) and phenoxyethyl acrylate (90% by mass), manufactured by Chem First Corporation)

TABLE 1

|  | Example | 1 | 2 | 3 | 4 | 5 | 6 | 7 | 8 | 9 | 10 |
|---|---|---|---|---|---|---|---|---|---|---|---|
| Mill base | Black | 9.0 | 9.0 | — | 9.0 | 9.0 | 9.0 | — | — | 9.0 | 9.0 |
|  | Magenta | — | — | 15.0 | — | — | — | 15.0 | 15.0 | — | — |
| Monomer | NVC | — | — | — | 17.0 | 20.0 | 20.0 | 20.0 | 20.0 | 20.0 | 20.0 |
|  | NVF | — | — | 15.0 | — | — | — | — | — | — | — |
|  | PEA | — | 30.0 | 35.0 | 33.0 | 30.0 | 30.0 | 30.0 | 30.0 | 27.0 | 57.0 |
|  | IBOA | 29.0 | 30.0 | 15.0 | — | — | — | — | — | — | — |
|  | CTFA | — | — | — | 15.0 | 15.0 | 15.0 | 15.0 | 15.0 | — | — |
|  | SA | 40.0 | — | — | — | — | — | — | — | — | — |
|  | SR9003 | 5.0 | — | — | — | — | — | — | — | — | — |
|  | DPGDA | — | 14.0 | 3.0 | 9.0 | 9.0 | 9.0 | 3.0 | 3.0 | 30.0 | 0.0 |
| Oligomer | CN964A85 | 4.0 | 4.0 | 4.0 | — | — | — | — | — | 4.0 | 4.0 |
|  | CN962 | — | — | — | 4.0 | 4.0 | 4.0 | 4.0 | 4.0 | — | — |
| Initiator | Irg184 | 5.0 | 5.0 | 5.0 | 5.0 | 5.0 | 5.0 | 5.0 | 5.0 | — | — |
|  | Irg369 | — | — | — | — | — | — | — | — | — | — |
|  | Irg819 | — | — | — | — | — | — | — | — | 3.0 | 3.0 |
|  | TPO | 7.0 | 7.0 | 7.0 | 7.0 | 7.0 | 7.0 | 7.0 | 7.0 | 3.0 | 3.0 |
|  | ITX | — | — | — | — | — | — | — | — | 3.0 | 3.0 |
| Additive | ST-1 | 1.0 | 1.0 | 1.0 | 1.0 | 1.0 | 1.0 | 1.0 | 1.0 | 1.0 | 1.0 |
| Sum |  | 100 | 100 | 100 | 100 | 100 | 100 | 100 | 100 | 100 | 100 |
| % by mass of monofunctional monomers |  | 69.0 | 60.0 | 65.0 | 65.0 | 65.0 | 65.0 | 65.0 | 65.0 | 47.0 | 77.0 |
| Dissolved oxygen content (mg/L) |  | 10.0 | 10.0 | 10.0 | 9.0 | 9.0 | 12.0 | 9.0 | 25.0 | 9.5 | 9.5 |
| SP value $(MPa)^{1/2}$ |  | 17.4 | 19.4 | 22.2 | 20.7 | 20.7 | 20.7 | 20.7 | 20.7 | 20.6 | 21.0 |
| Evaluation results | Storage stability | B | A | A | A | A | A | A | A | B | A |
|  | Light source | I | I | I | I | I | I | I | I | II | II |
|  | Curing sensitivity | B | B | B | B | A | A | A | B | A | A |

|  | Example | 11 | 12 | 13 | 14 | 15 | 16 | 17 | 18 | 19 | 20 |
|---|---|---|---|---|---|---|---|---|---|---|---|
| Mill base | Black | 9.0 | 9.0 | 9.0 | — | — | 9.0 | 9.0 | — | — | — |
|  | Magenta | — | — | — | 15.0 | 15.0 | — | — | 15.0 | 15.0 | 15.0 |
| Monomer | NVC | 30.0 | 22.0 | 22.0 | 22.0 | 22.0 | 24.0 | 24.0 | 24.0 | 24.0 | 24.0 |
|  | NVF | — | — | — | — | — | — | — | — | — | — |
|  | PEA | 47.0 | — | — | — | — | 33.0 | 30.0 | 29.0 | 26.0 | 24.0 |
|  | IBOA | — | 15.0 | 15.0 | 15.0 | 15.0 | 15.0 | 15.0 | 15.0 | 15.0 | 15.0 |
|  | CTFA | — | 33.0 | 30.0 | 33.0 | 30.0 | — | — | — | — | — |
|  | SA | — | — | — | — | — | — | — | — | — | — |
|  | SR9003 | — | 7.0 | 7.0 | 1.0 | 1.0 | — | — | — | — | — |
|  | DPGDA | — | — | — | — | — | 5.0 | 5.0 | 3.0 | 3.0 | 3.0 |
| Oligomer | CN964A85 | 4.0 | 4.0 | 4.0 | 4.0 | 4.0 | 4.0 | 4.0 | 4.0 | 4.0 | 4.0 |
|  | CN962 | — | — | — | — | — | — | — | — | — | — |
| Initiator | Irg184 | — | — | — | — | — | — | — | — | — | — |
|  | Irg369 | — | 3.0 | 4.0 | 3.0 | 4.0 | — | — | — | — | — |
|  | Irg819 | 3.0 | 3.0 | 4.0 | 3.0 | 4.0 | 3.0 | 4.0 | 3.0 | 4.0 | 5.0 |
|  | TPO | 3.0 | — | — | — | — | 3.0 | 4.0 | 3.0 | 4.0 | 5.0 |
|  | ITX | 3.0 | 3.0 | 4.0 | 3.0 | 4.0 | 3.0 | 4.0 | 3.0 | 4.0 | 4.0 |
| Additive | ST-1 | 1.0 | 1.0 | 1.0 | 1.0 | 1.0 | 1.0 | 1.0 | 1.0 | 1.0 | 1.0 |
| Sum |  | 100 | 100 | 100 | 100 | 100 | 100 | 100 | 100 | 100 | 100 |
| % by mass of monofunctional monomers |  | 77.0 | 70.0 | 67.0 | 70.0 | 67.0 | 72.0 | 69.0 | 68.0 | 65.0 | 63.0 |
| Dissolved oxygen content (mg/L) |  | 9.5 | 9.0 | 15.0 | 9.5 | 30.0 | 9.5 | 18.0 | 9.2 | 35.0 | 50.0 |
| SP value $(MPa)^{1/2}$ |  | 21.1 | 19.7 | 19.7 | 19.7 | 19.7 | 20.3 | 20.3 | 20.3 | 20.3 | 20.3 |
| Evaluation results | Storage stability | A | B | A | A | A | A | A | A | A | A |
|  | Light source | II | II | II | II | II | II | II | II | II | II |
|  | Curing sensitivity | A | A | A | A | B | A | A | A | B | B |

TABLE 2

|  | Example | 14a | 14b | 14c | 14d | 12a | 12b | 12c | 12d |
|---|---|---|---|---|---|---|---|---|---|
| Mill base | Black | — | — | — | — | 9.0 | 9.0 | 9.0 | 9.0 |
|  | Magenta | 15.0 | 15.0 | 15.0 | 15.0 | — | — | — | — |
| Monomer | NVC | 22.0 | 22.0 | 22.0 | 22.0 | 22.0 | 22.0 | 22.0 | 22.0 |
|  | IBOA | 15.0 | 15.0 | 15.0 | 15.0 | 15.0 | 15.0 | 15.0 | 15.0 |
|  | CTFA | 33.0 | 33.0 | 33.0 | 33.0 | 33.0 | 33.0 | 33.0 | 33.0 |
|  | SR9003 | 1.0 | 1.0 | 1.0 | 1.0 | 7.0 | 7.0 | 7.0 | 7.0 |
| Oligomer | CN964A85 | 4.0 | 4.0 | 4.0 | 4.0 | 4.0 | 4.0 | 4.0 | 4.0 |
| Initiator | Irg369 | 3.0 | 3.0 | 3.0 | 3.0 | 3.0 | 3.0 | 3.0 | 3.0 |
|  | Irg819 | 3.0 | 3.0 | 3.0 | 3.0 | 3.0 | 3.0 | 3.0 | 3.0 |
|  | ITX | 3.0 | 3.0 | 3.0 | 3.0 | 3.0 | 3.0 | 3.0 | 3.0 |
| Additive | ST-1 | 1.0 | 1.0 | 1.0 | 1.0 | 1.0 | 1.0 | 1.0 | 1.0 |
| Sum |  | 100 | 100 | 100 | 100 | 100 | 100 | 100 | 100 |
| % by mass of monofunctional monomers |  | 70.0 | 70.0 | 70.0 | 70.0 | 70.0 | 70.0 | 70.0 | 70.0 |
| Dissolved oxygen content (mg/L) |  | 9.5 | 9.5 | 9.5 | 9.5 | 9.0 | 9.0 | 9.0 | 9.0 |
| Dissolved oxygen content after degassing (mg/L) |  | 9.5 | 7.0 | 3.0 | 1.0 | 9.0 | 7.0 | 3.0 | 1.0 |
| SP value $(MPa)^{1/2}$ |  | 19.7 | 19.7 | 19.7 | 19.7 | 19.7 | 19.7 | 19.7 | 19.7 |
|  | Light source | II | II | II | II | II | II | II | II |
|  | Gloss at 60° | 20 | 15 | 9 | 7 | 24 | 19 | 15 | 11 |

TABLE 3

|  | Comparative Example | 1 | 2 | 3 | 4 | 5 | 6 | 7 |
|---|---|---|---|---|---|---|---|---|
| Mill base | Black | 9.0 | — | 9.0 | — | 9.0 | — | 9.0 |
|  | Magenta | — | 15.0 | — | 15.0 | — | 15.0 | — |
| Monomer | NVC | 20.0 | 20.0 | 20.0 | 20.0 | 20.0 | 20.0 | 20.0 |
|  | PEA | 30.0 | 30.0 | 30.0 | 33.0 | 33.0 | 33.0 | 30.0 |
|  | IBOA | 15.0 | 15.0 | 15.0 | 15.0 | 15.0 | 15.0 | 15.0 |
|  | DPGDA | 9.0 | 3.0 | 9.0 | 3.0 | 9.0 | 3.0 | 9.0 |
| Oligomer | CN964A85 | — | — | 4.0 | 4.0 | 4.0 | 4.0 | 4.0 |
|  | CN962 | 4.0 | 4.0 | — | — | — | — | — |
| Initiator | Irg184 | 5.0 | 5.0 | — | — | — | — | — |
|  | Irg369 | — | — | 4.0 | 3.0 | — | — | — |
|  | Irg819 | — | — | 4.0 | 3.0 | 3.0 | 3.0 | 3.0 |
|  | TPO | 7.0 | 7.0 | — | — | 3.0 | 3.0 | 3.0 |
|  | ITX | — | — | 4.0 | 3.0 | 3.0 | 3.0 | 3.0 |
| Additive | ST-1 | 1.0 | 1.0 | 1.0 | 1.0 | 1.0 | 1.0 | 4.0 |
| Sum |  | 100 | 100 | 100 | 100 | 100 | 100 | 100 |
| % by mass of monofunctional monomers |  | 74.0 | 68.0 | 74.0 | 71.0 | 77.0 | 71.0 | 74.0 |
| Dissolved oxygen content (mg/L) |  | 3.0 | 6.5 | 8.5 | 4.0 | 5.0 | 4.0 | 5.0 |
| SP value $(MPa)^{1/2}$ |  | 20.7 | 20.7 | 20.7 | 20.7 | 20.7 | 20.7 | 20.7 |
| Evaluation results | Storage stability | D | C | C | D | C | D | B |
|  | Light source | I | I | II | II | II | II | II |
|  | Curing sensitivity | A | B | A | A | A | A | C |

What is claimed is:

1. An ink composition comprising:
a radically polymerizable compound;
a radical polymerization initiator; and
a colorant, and
having a dissolved oxygen content of 9 mg/L or more.

2. The ink composition according to claim 1, wherein the dissolved oxygen content is from 9 to 50 mg/L.

3. The ink composition according to claim 1, wherein the radically polymerizable compound includes a monofunctional radically polymerizable compound and a polyfunctional radically polymerizable compound.

4. The ink composition according to claim 3, wherein the proportion of the monofunctional radically polymerizable compound in the radically polymerizable compound is from 45 to 96% by mass.

5. The ink composition according to claim 3, wherein the monofunctional radically polymerizable compound contains an N-vinyl compound.

6. The ink composition according to claim 5, wherein the N-vinyl compound contains a compound represented by the following formula (a-1):

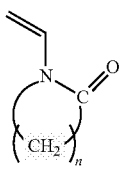

(a-1)

wherein in the formula (a-1), n represents an integer of 2 to 6.

7. The ink composition according to claim 6, wherein the amount of the compound represented by the formula (a-1) is 15% by mass or more, based on the total mass of the ink composition.

8. The ink composition according to claim 7, wherein the monofunctional radically polymerizable compound further contains a compound represented by the formula (a-3):

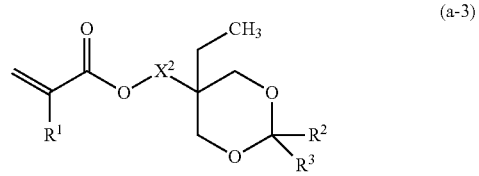

wherein in the formula (a-3), $R^1$, $R^2$, and $R^3$ each independently represents a hydrogen atom, a methyl group, or an ethyl group, and $X^2$ represents a single bond or a divalent linking group.

9. The ink composition according to claim 5, wherein the monofunctional radically polymerizable compound further contains a compound represented by the formula (a-3):

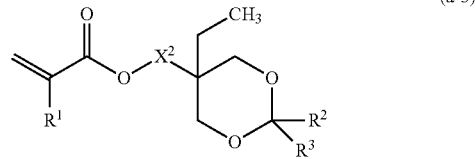

wherein in the formula (a-3), $R^1$, $R^2$, and $R^3$ each independently represents a hydrogen atom, a methyl group, or an ethyl group, and $X^2$ represents a single bond or a divalent linking group.

10. The ink composition according to claim 9, wherein the monofunctional radically polymerizable compound further contains a compound represented by the formula (a-4):

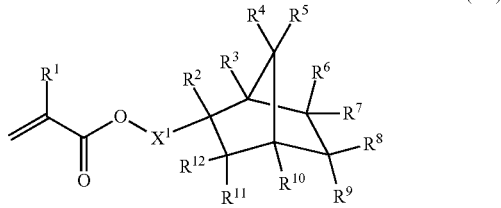

wherein in the formula (a-4), $R^1$ represents a hydrogen atom or a methyl group, $X^1$ represents a single bond or divalent linking group, and $R^2$ to $R^{12}$ each independently represents a hydrogen atom or an alkyl group.

11. The ink composition according to claim 5, wherein the monofunctional radically polymerizable compound further contains a compound represented by the formula (a-4):

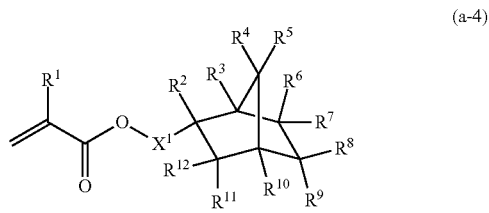

wherein in the formula (a-4), $R^1$ represents a hydrogen atom or a methyl group, $X^1$ represents a single bond or divalent linking group, and $R^2$ to $R^{12}$ each independently represents a hydrogen atom or an alkyl group.

12. The ink composition according to claim 1, wherein an SP (Solubility Parameter) value of the entire radically polymerizable compound is 17.0 or more.

13. An ink container, which has a gas-impermeable structure and encapsulates the ink composition according to claim 1.

14. An ink jet recording method comprising:
a degassing step of reducing a dissolved oxygen between an ink container that stores the ink composition according to claim 1 and ink-discharging nozzles; and
a discharging step of discharging the degassed ink composition from the nozzles.

15. The ink jet recording method according to claim 14, wherein in the degassing step, a dissolved oxygen content in the ink composition is 7 mg/L or less.

16. The ink jet recording method according to claim 14, wherein the ink composition contains an N-vinyl compound.

17. The ink jet recording method according to claim 16, wherein the ink composition further contains a compound represented by the formula (a-3):

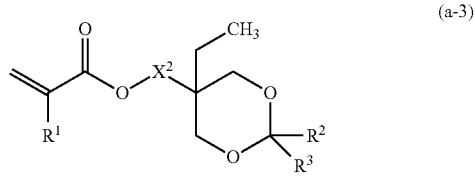

wherein in the formula (a-3), $R^1$, $R^2$, and $R^3$ each independently represents a hydrogen atom, a methyl group, or an ethyl group, and $X^2$ represents a single bond or a divalent linking group.

* * * * *